United States Patent [19]

Harunari et al.

[11] Patent Number: 4,720,723

[45] Date of Patent: Jan. 19, 1988

[54] DISTANCE MEASURING DEVICE

[75] Inventors: Yoshihiro Harunari; Ryuji Tokuda, both of Tokyo; Takashi Kobe, Kanagawa, all of Japan

[73] Assignee: Canon Kabushiki Kaisha

[21] Appl. No.: 842,067

[22] Filed: Mar. 20, 1986

Related U.S. Application Data

[63] Continuation of Ser. No. 623,771, Jun. 22, 1984, abandoned.

[30] Foreign Application Priority Data

| Jun. 24, 1983 | [JP] | Japan | 58-114820 |
| Jun. 24, 1983 | [JP] | Japan | 58-114821 |
| Jun. 28, 1983 | [JP] | Japan | 58-117541 |
| Jul. 13, 1983 | [JP] | Japan | 58-127409 |
| Apr. 23, 1984 | [JP] | Japan | 59-80162 |

[51] Int. Cl.$^4$ .............................................. G03B 3/00
[52] U.S. Cl. ...................................... 354/403; 354/402
[58] Field of Search ................................. 354/403, 402

[56] References Cited

U.S. PATENT DOCUMENTS

| 4,303,319 | 12/1981 | Hell et al. | 354/403 |
| 4,344,024 | 8/1982 | Cocron | 354/403 |
| 4,345,827 | 8/1982 | Stemme et al. | 354/403 |
| 4,464,038 | 8/1984 | Nanba | 354/403 |
| 4,477,168 | 10/1984 | Hosoe | 354/403 |
| 4,490,031 | 12/1984 | Anagnostopoulos et al. | 354/403 |
| 4,490,036 | 12/1984 | Anagnostopoulos et al. | 354/403 |
| 4,675,517 | 6/1987 | Shiomi | 354/403 |

Primary Examiner—Russell E. Adams
Attorney, Agent, or Firm—Toren, McGeady & Associates

[57] ABSTRACT

In a distance measuring device which has a semiconductor position sensor or the like employed as a light receiving element and which produces two different signals corresponding to the incident angles of a light coming from an object, the signals from the light receiving element are supplied, one after another, to a dual-slope type integrator such as a Miller integrator. A length of time required for reverse integration of the dual-slope type integrator is measured. Distance to the object is computed on the basis of the measured time.

25 Claims, 24 Drawing Figures

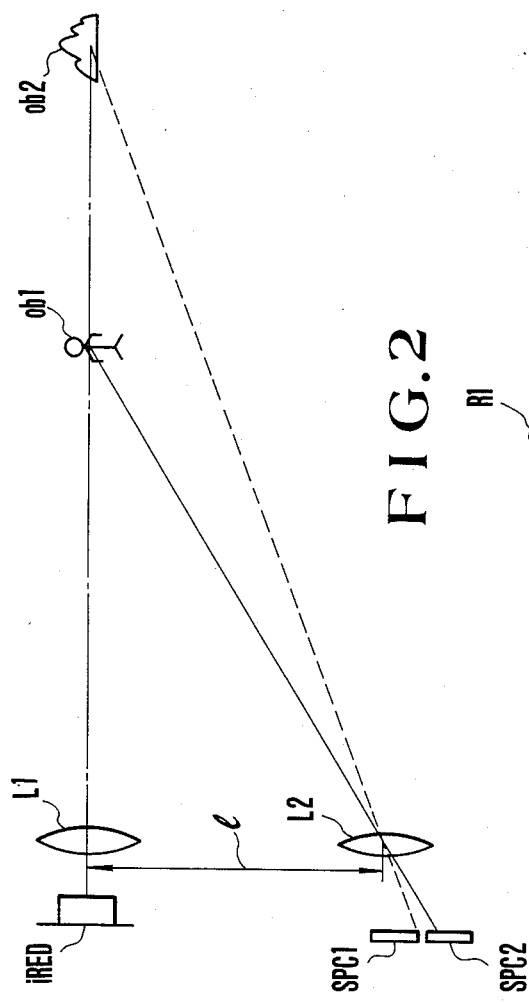

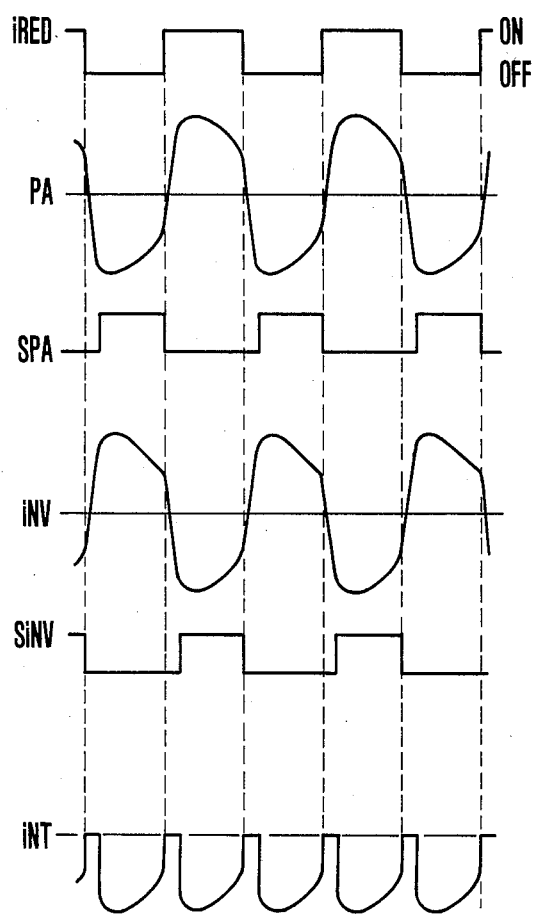

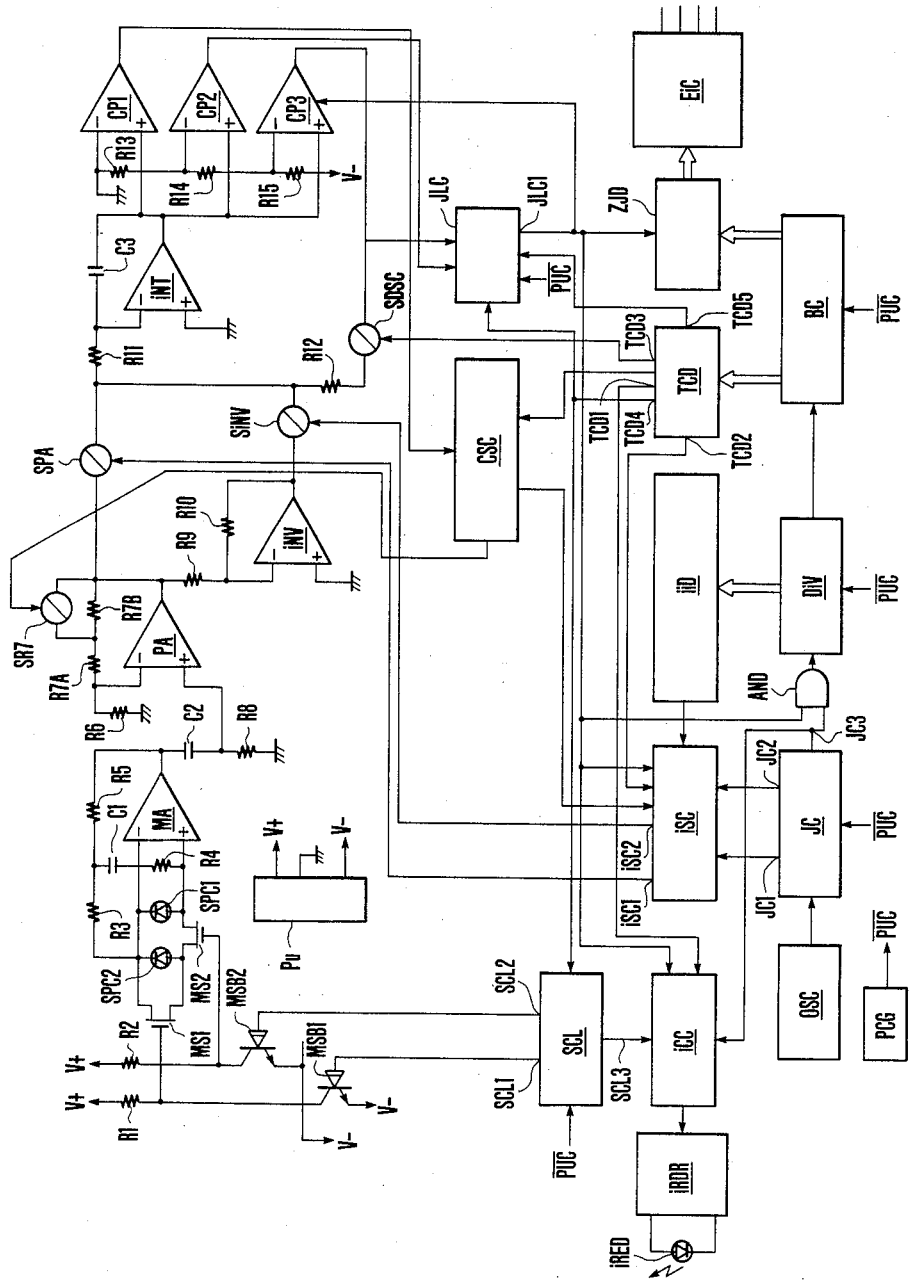
F I G. 11

F I G.13
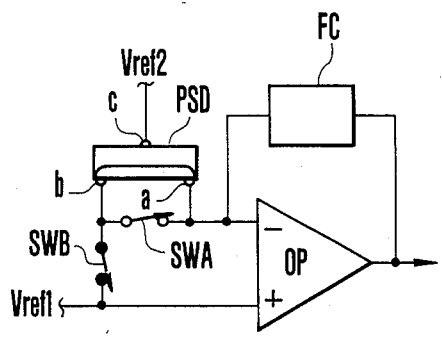
F I G.15
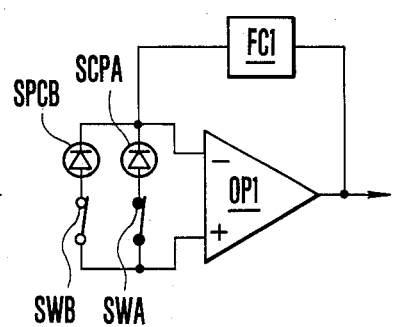
F I G.14
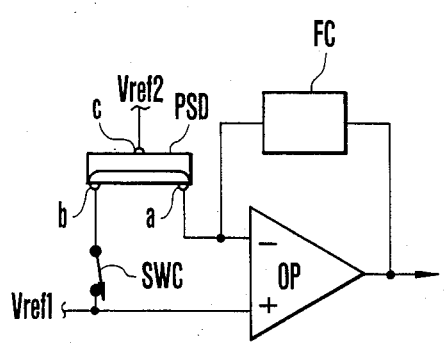
F I G.16
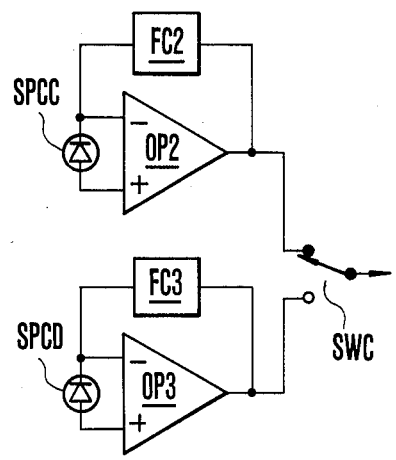

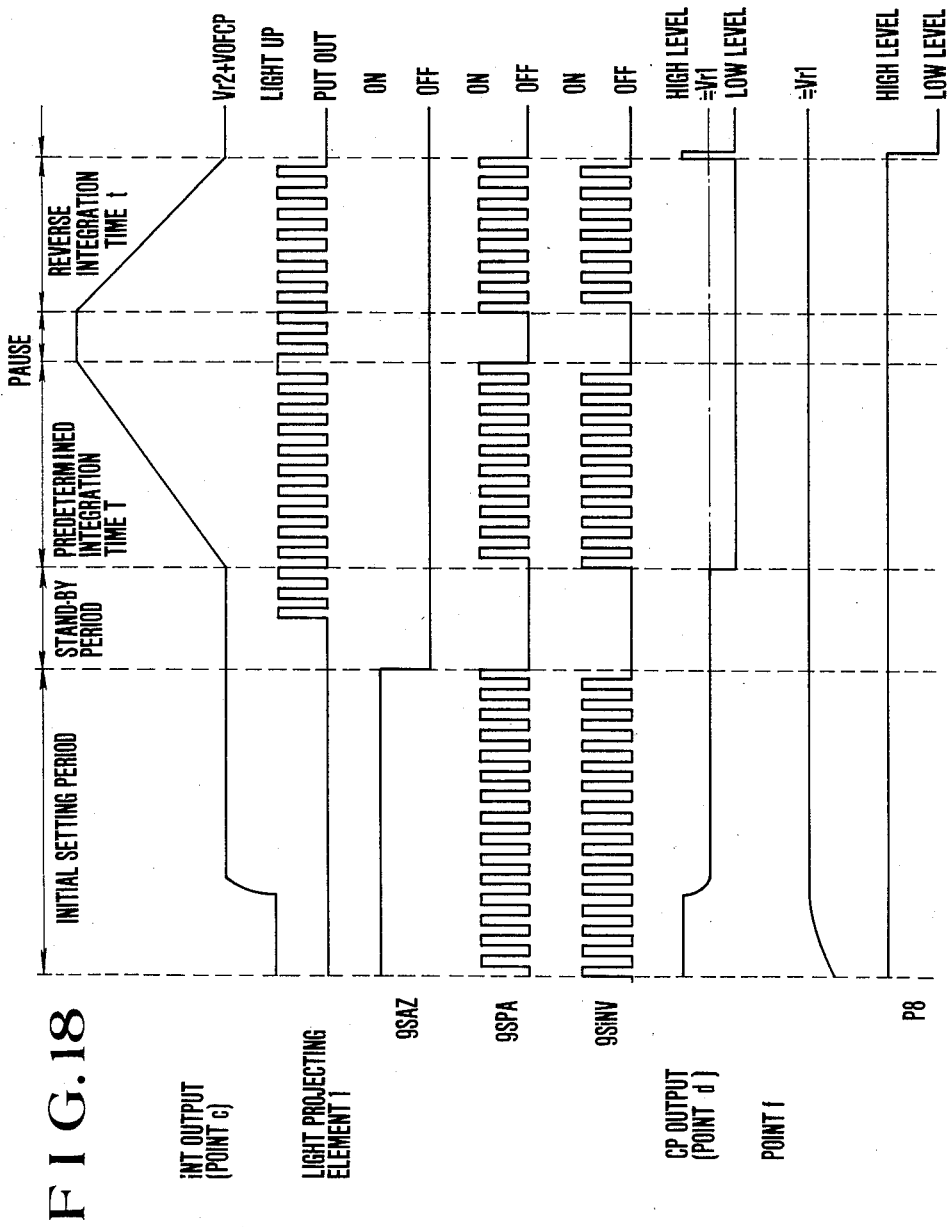
F I G. 18

DISTANCE MEASURING DEVICE

This is a continuation of application Ser. No. 623,771, filed June 22, 1984 now abandoned.

BACKGROUND OF THE INVENTION

1. Field of the Invention

This invention relates to a distance measuring device and more particularly to the computing processing circuit of a distance measuring device for a camera.

2. Description of the Prior Art

Cameras have been known which use a distance computing method in which a distance from the camera to the object to be photographed is computed from the ratio of two different distance information signals, varying with the object distance. A camera of this kind is provided with a circuit for obtaining the actual ratio of the above different distance information signals. For such a circuit, there is known a digital method in which each of these different distance information signals is analog-to-digital (A-D) converted and the ratio is computed by means of shift registers, etc. In another known method for the same purpose, a subtracting operation is carried out with the two different distance information signals respectively logarithmically compressed. However, the first method, which necessitates use of A-D converters, results not only in a large circuit scale but also in a long time period required for A-D conversion and, thus, takes a long time period for distance measurement because of a slow computing process. Furthermore, when using a distance measuring device of the so-called active type, a light signal corresponding to the brightness of the object to be photographed varies to a great extent with the distance from the distance measuring device to the object and thus requires a large dynamic range for the signal processing circuit of the device and a large number of bits for the A-D converter. Therefore, in that situation, the circuit scale increases further and the A-D conversion time becomes longer. The above second method in which distance information values are converted into logarithmic values and their ratio is obtained by subtraction results in a large error, which makes variations in the small ratio value hardly discernible. In the distance measuring device for a camera in particular, the power source is a dry cell and the dynamic range of the element outputs in a signal processing circuit is only 1.5 to 3.0 V or thereabouts. Furthermore, the offset voltage of amplifiers included in the signal processing circuit further narrows the dynamic range. To solve this problem, some known distance measuring devices are provided with booster circuits for widening the dynamic range. However, this arrangement not only results in a large circuit scale but also increases the cost of the device.

It is therefore an object of this invention to provide a distance measuring device which eliminates the shortcomings of the prior art devices.

This and other objects and features of the invention will become apparent from the following detailed description of the preferred embodiments thereof taken in conjunction with the accompanying drawings.

SUMMARY OF THE INVENTION

A distance measuring apparatus comprising light projecting means, light receiving means for producing in sequence at least two different signals corresponding to the incident angle of a reflection light from a distance measuring object, and integrating means for integrating the first output of the light receiving means for a predetermined time period and performing reverse integration according to the second output of the light receiving means. The apparatus also includes detecting means for detecting that the output of the integrating means has reached a predetermined value during reverse integration and time counting means for detecting the reverse integration time in response to the output of the detecting means and distance information producing means for producing information on a distance to the object on the basis of the time counting means output.

BRIEF DESCRIPTION OF THE DRAWINGS

FIG. 1 is a schematic illustration showing the operating principle of a distance detecting or measuring device is an embodiment of the present invention.

FIG. 2 is a plan view showing the photo-sensitive element employed in the embodiment shown in FIG. 1.

FIGS. 5, 6(a), 6(b), 7, 8 and 9 are wave form charts showing the wave forms of outputs of various parts of the circuit arrangement shown in FIG. 4.

FIG. 11 is a circuit diagram of a third embodiment of the invention.

FIG. 13 is a circuit diagram showing a different example of the light receiving circuit of the embodiment shown in FIG. 4.

FIG. 14 is a circuit diagram showing a modification of the light receiving circuit of FIG. 13.

FIGS. 15 and 16 are circuit diagrams showing other embodiments of the invention.

FIG. 18 is a time chart showing the operation of an embodiment of the invention.

DETAILED DESCRIPTION OF THE PREFERRED EMBODIMENTS

FIG. 1 is a schematic illustration showing the operating principle of a distance measuring device for a camera to which the present invention is applied. FIG. 2 is a plan view showing the photo-sensitive element of FIG. 1. Referring to FIGS. 1 and 2, a light projecting element iRED projects linear infrared rays via a light projecting lens L1 on objects to be photographed ob1 and ob2. A light receiving lens L2 forms the image of reflection light fluxes coming from the objects ob1 and ob2 on two photo-sensitive elements SPC1 and SPC2. The light receiving lens L2 is located away from the light projection optical axis at a distance l (hereinafter called the base length). An image RI formed by the reflection light from the object ob1 and ob2 on the photo-sensitive elements SPC1 and SPC2 continuously moves in a direction l1, perpendicular to the light projection optical axis (hereinafter called the base length direction) as the object ob1 and ob2 distance varies. These photo-sensitive elements SPC1 and SPC2 are formed in a wedge shape as shown in FIG. 2. The output of one of the photo-sensitive elements SPC1 and SPC2 increases and the output of the other decreases as the object ob1 and ob2 distance varies. Assuming that the outputs of these photo-sensitive elements SPC1 and SPC2 are A and B, a signal normalized by (A+B) such as A/(A+B) represents the position of the object ob1 and ob2 and the distance to the object ob1, ob2 which is to be measured. Furthermore, an automatic focusing device is obtainable by controlling the shifting extent of a photo-taking lens by the output of the distance measuring device.

Figure 3:
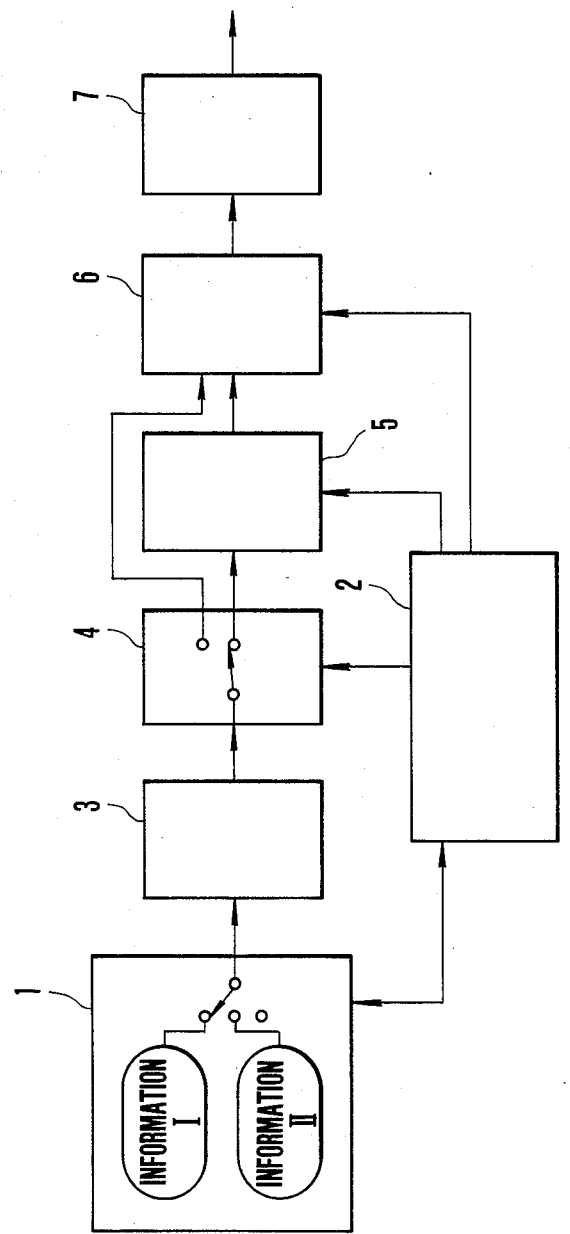
FIG. 3 is a block diagram showing the outline of the distance measuring device of the present invention.

FIG. 3 schematically shows a distance measuring device to which the invention is applied as an embodiment thereof. In the embodiment, distance measurement information generating means 1 includes the first and second photo-sensitive elements SPC1 and SPC2 which are arranged as shown in FIG. 2 to produce, in a time sharing manner, first and second distance measurement signals which vary with the object ob1, ob2 distance. A block 2 represents control means which controls the distance measurement information generating means 1, a signal processing circuit 3, switch means 4, memory or storage means 5, computing means 6 and distance determining means 7. The control in this embodiment is accomplished by electrical switch means. However, the control over the outputs of the distance measurement information generating means 1 may be accomplished by shifting the position of a mechanical switch by means of a member which operates in response to depression of the shutter button (not shown); or may be accomplished by providing masks on the photo-sensitive elements SPC1 and SPC2 and by moving the masks in a predetermined sequence. The above signal processing circuit 3 performs signal processing operations such as amplification, etc. The switch means 4 supplies the output of the signal processing circuit 3 to the storage means 5 or to the computing means 6 based on the kind of information generated from the distance measurement information generating means 1 or the time sharing mode of the information. The storage means 5 stores the output of the signal processing circuit 3. The computing means 6 performs a computing operation on the output of the storage means 5 and the output of the signal processing circuit 3 directly obtained from the switch means 4. The distance determining means 7 determines the object ob1, ob2 distance from the output of the storage means 6 and produces a control signal to a display circuit (not shown) or to a photo-taking lens control circuit (not shown). The embodiment arranged in this manner operates as described below:

The control means 2 supplies the first output of the distance measurement information generating means 1 to the signal processing circuit 3. The switch means 4, which is under the control of the control means 2, supplies the output of the signal processing circuit 3 to the storage means 5 and holds it there. Next, the control means 2 causes the distance measurement information generating means 1 to supply its second output to the signal processing circuit 3. The position of the switch means 4 is shifted by the control means 2 supplying the output of the signal processing circuit 3 directly to the computing means 6 without going through the storage means 5. Concurrently, the control means 2 also supplies the signal of the storage means 5 to the computing means 6. The computing means 6 performs computation and produces a computed result. The distance determining means 7 determines distance from the computation, produces distance information and supplies it to a subsequent circuit stage.

Figure 4:
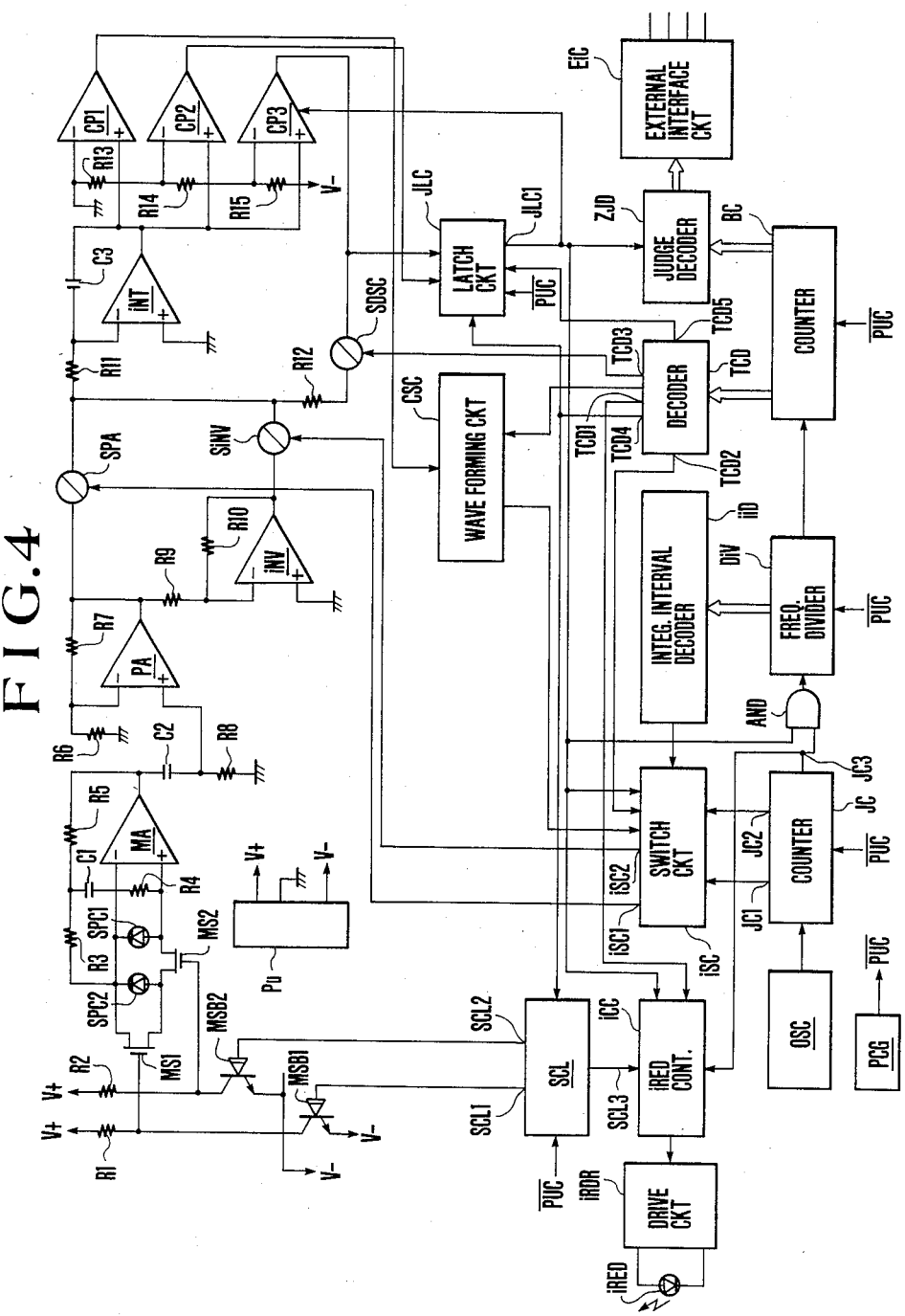
FIG. 4 is a circuit diagram showing the details of the distance measuring device of the present invention.

FIG. 4 shows a more specific circuit arrangement of the distance measuring (or distance detecting) device for a camera arranged according to the invention. Referring to FIG. 4, the light projecting element iRED projects a light flux via a lens (not shown) on the distance measuring object (not shown). For example, an infrared ray emitting diode is employed as the light projecting element iRED. An iRED driving circuit iRDR flickers the light projecting element iRED at a predetermined light quantity level. Analog switches MS1 and MS2 are composed of MOS-FET. Buffer amplifiers MSB1 and BSB2 amplify on-off signals produced from the MOS-FET switches MS1 and MS2. An operational amplifier MA has a high input impedance and converts into voltages the currents produced from the photo-sensitive elements SPC1 and SPC2, which are arranged as shown in FIG. 2. The operational amplifier MA has a negative feedback route consisting of resistors R3, R4 and R5 and a capacitor C1 to perform a DC suppressing function. A pre-amplifier PA receives at its non-inversion input terminal a signal which has its DC component cut via a high-pass filter formed by a capacitor C2 and a resistor R8 and amplifies the signal thus received. An inverter INV has a gain of −1 time and inverts the output signal of the pre-amplifier PA. An operational amplifier iNT forms a Miller integration circuit in conjunction with a capacitor C3 and integrates the output of the pre-amplifier PA. Analog switches SPA, SiNV and SDSC have no voltage drop when they are on. A resistor R11 is connected to the inversion input terminal of the operational amplifier iNV. Reference symbols CP1, CP2 and CP3 identify comparators. Voltage dividing resistors R13, R14 and R15 respectively to supply reference level voltages to the comparators CP1, CP2 and CP3 and are connected in series. The resistor R13 has one end thereof grounded. Another resistor R15 has one end thereof connected to a power source of −volt. A known oscillation circuit OSC generates a clock signal. A Johnson counter JC frequency divides the clock signal of the oscillation circuit OSC into ½×a number of steps and obtains signals which are of the same period as the frequency divided outputs of varied phases varying with one clock pulse width, which is the unit of their phase difference. An AND gate AND supplies the frequency divided output of the Johnson counter JC to a frequency dividing circuit DiV, which will be described later. When a high level signal (hereinafter called an H level) signal is produced from a distance measurement completion judging and latch circuit JLC which will be described later, that is, during a distance measuring process; it inhibits the frequency divided output from being supplied to the frequency dividing circuit DiV after completion of the distance measuring process when a low level signal is produced from the circuit JLC. The above is arranged frequency dividing circuit DiV is arranged further frequency divides the clock signal. The frequency dividing circuit DiV supplies its output to a binary counter BC and also supplies an output signal of each stage to an interval decoder iiD for integrating characteristic compression. The binary counter BC is a four bits counter and is composed of flip-flops. The binary counter BC counts the output signals of the frequency dividing circuit DiV and supplies the output of each flip-flop to a timing control decoder TCD and a distance measuring zone judging detector ZJD. In this specific embodiment, the contents of the binary counter BC will be expressed in sexadecimal digits in the following description of circuit operations. The distance measuring zone judging decoder ZJD detects a distance zone in which the measured distance to the object ob1, ob2 is located from the signal produced from the binary counter BC and a distance measurement completion signal produced from the distance measurement completion judging the latch circuit JLC. For example, when the content of the binary counter BC is "7" or "8" when the distance measurement completion signal changes from an H level to a low level (hereinafter called an L level) after completion of a distance measuring process, for example, the distance measuring zone judging decoder ZJD produces a signal indicating that the ob1, ob2 distance is located within a very distant zone. The distance measuring zone judging decoder ZJD produces a signal indicating that the object ob1, ob2 is located within a medium distance zone if the content of the binary counter BC is "9". Another signal indicates that the object is within a near distance zone if the content is "A" and a signal indicates that the object is within a very near distance zone if the content is "B". An external interface circuit EiC displays distance measurement data and drives the photo-taking lens (not shown) of a still picture camera, a video camera or the like in response to a signal produced from the distance measuring zone judging decoder ZJD. The timing control decoder TCD produces different timing signals, as shown at parts TCD1-TCD5 in FIG. 5, in response to the signal of the binary counter BC. The timing signals of the timing control decoder TCD are supplied to the distance measurement completion judging and latch circuit JLC, a compression signal wave-form shaping circuit CSC, an SPC controlling latch circuit SCL, an iRED control circuit iCC, integration switch control circuit iSC and an analog switch SDSC. These circuits are, thus, under the control of the timing signals. The compression signal wave-form shaping circuit CSC prevents the chattering of a compression signal detected by the comparator CP1. The compression signal wave-form shaping circuit CSC holds an H level signal first produced from the comparator CP1 while the output of the Miller integrator rises and holds an L level signal first produced from the comparator CP1 while the output of the Miller integrator falls.

Figure 7:
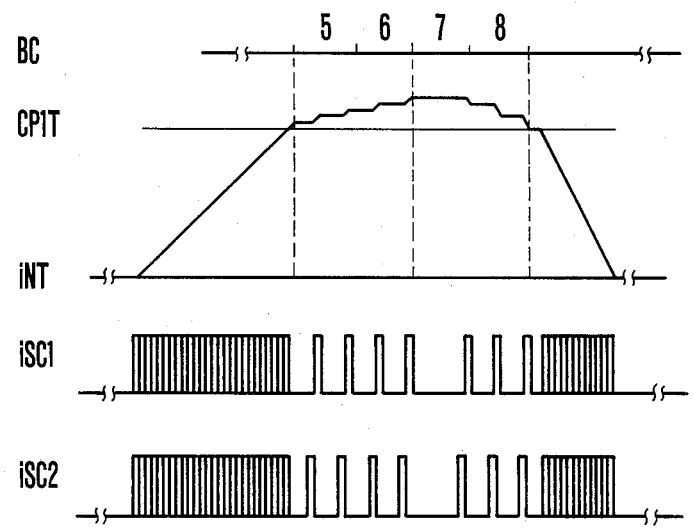
Figure 8:
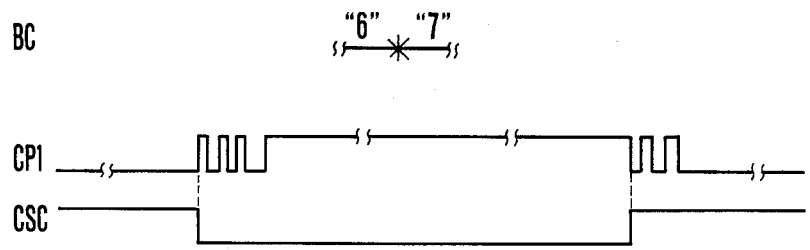
Figure 9:
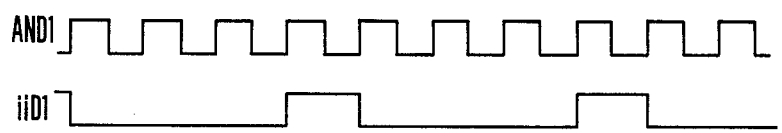

The integration characteristics compressing interval decoder iiD decodes the output of the frequency dividing circuit DiV for compressing the output of the operational amplifier iNT and supplies pulses, as shown at a part iiD1 of FIG. 9, to the integration switch control circuit iSC. A control signal is thus formed for integrating characteristic determining analog switches SPA and SiNV, which determine the integrating characteristic at the time of compressing an integrating characteristic. The integration switch control circuit iSC forms control signals from the output signal of the Johnson counter JC signals for controlling opening and closing of the analog switches SPA and SiNV, as shown at parts iSC1 and iSC2 in FIGS. 5 and 7. The iRED control circuit iCC turns off the light projecting element iRED upon receipt, from the timing controlling decoder TCD, a signal indicating that the content of the binary counter BC is "0" or "1" or when the output signal of the distance measurement completion judging and latch circuit JLC is at an L level. In other situations, the circuit iCC flickers the light projecting element iRED by means of a signal obtained by computing the exclusive logical sum of the output signal of the SPC controlling latch circuit SCL and the output signal of the Johnson counter JC. The SPC controlling latch circuit SCL produces pulses as shown at parts SCL1 and SCL2 in FIG. 5. The latch circuit SCL controls the analog switches MS1 and MS2 supplying the operational amplifier MA with the output signal of the photo-sensitive element SPC1 at the time of upward integration and with the output signals of the photo-sensitive elements SPC1 and SPC2 at the time of downward integration. A PUC signal generating circuit PSG produces a signal PUC for clearing each circuit when a power supply switch is closed.

Referring to FIGS. 5–9, the distance measuring device, which is arranged as described above, operates in the following manner: When a shutter release button (not shown) is depressed, a power supply circuit PU produces a voltage (V+, V−), as shown in FIG. 4. Each circuit is supplied with that voltage.

Upon receiving the power supply, the PUC signal generating circuit PSG produces a power-up-clear signal $\overline{PUC}$. The Johnson counter JC, the frequency dividing circuit DiV, the binary counter BC and the SPC controlling latch circuit SCL are cleared. Upon completion of the clearing process, the Johnson counter JC counts the clock signal produces from the oscillation circuit OSC. An output terminal JC3 of the counter JC produces an output signal which is obtained by frequency dividing the clock signal. At that instant, an H (high) level signal is supplied from the distance measurement completion judging the latch circuit JLC to one of the input terminals of the AND gate AND. Therefore, the AND gate AND supplies the frequency divided output from the Johnson counter JC to the frequency dividing circuit DiV. The frequency dividing circuit DiV further frequency divides this input signal (see AND1 of FIG. 9) and supplies it to the binary counter BC as an input signal. Therefore, after a power-up-clear process, the content of the binary counter BC gradually increases from "0". The output terminal TCD1 of the decoder TCD, which decodes the content of the binary counter BC, remains at an L level while the content of the binary counter BC is between "0" and "1", as shown at a part TCD1 in FIG. 5. The output terminal of the iRED control circuit icc also remains at an L level while the content of the binary counter BC is between "0" and "1". The iRED driving circuit iRDR does not drive the light projecting element iRED and no light is projected during this period. Furthermore, while the content of the binary counter BC is between "0" and "2", the output terminal TCD2 of the timing control decoder TCD remains at an L level, as shown at a part TCD2 in FIG. 5, whereby the output terminals iSC1 and iSC2 of the integration switch control circuit iSC are at L levels. Therefore, the analog switches SPA and SiNV remain off and the integrating operation of the Miller integrator does not begin. Meanwhile, since the output terminal TCD3 of the timing control decoder TCD is at an H level while the content of the binary counter BC is between "0" and "2", as shown at a part TCD3 in FIG. 5, the analog switch SDSC remains on during this period. Then, the output terminal of the comparator CP3 is connected to the inversion input terminal of the operational amplifier iNT via resistors R12 and R11 forming a closed circuit of iNT-CP3-SOSC-R12-R11-iNT. With this closed circuit, the output level of the comparator CP3 is at an H level if the potential V2 of the output terminal of the operational amplifier iNT is higher than Vr2+OF2, wherein Vr2 represents the potential of the inversion input terminal of the comparator CP3 and OFF2 the offset voltage of the comparator CP3. Then, the high level output of the comparator CP3 charges the capacitor C3 via the analog switch SDSC and the resistors R12 and R11. The potential V2 of the output terminal of the operational amplifier iNT gradually decreases based on the change voltage. The charging action on the capacitor C3 stops when the potential V1 of the inversion input terminal of the operational amplifier iNT and the potential V3 of the output terminal of the comparator CP3 become equal after the lapse of a predetermined time period.

If the potential V2 of the output terminal of the operational amplifier iNT is lower than the above potential Vr2+OF2, the output terminal level of the comparator CP3 becomes an L level discharging the electric charge stored at the capacitor C3 via the resistors R11 and R12 and the analog switch SDSC. The potential V2 of the output terminal of the operational amplifier iNT rises. Then, in the same manner as in the above situation, the discharge of the capacitor C3 stops and a stable condition is obtained when the potential V1 of the inversion input terminal of the operational amplifier iNT and the potential V3 of the output terminal of the comparator CP3 become equal, after the lapse of a predetermined time period. Under this stable condition, the potential V2 of the output terminal of the operational amplifier iNT is as follows: Assuming that the amplification factor of the comparator CP3 is $\alpha$, there is obtained the following voltage relation: $V3=V2+\alpha(V2-Vr2-OF2)=V1$. This can be expressed as follows:

$$V2 = \frac{\alpha}{\alpha + 1}(Vr2 + OF2) + \frac{\alpha}{\alpha + 1}V1$$

Generally, the amplification factor $\alpha$ of an operational amplifier can be expressed as $\alpha >> 1$. Therefore, the above formula can be changed to $V2 \approx Vr2 + OF2$. The potential V2 of the output terminal of the operational amplifier iNT thus becomes approximately equal to the threshold voltage (Vr2+OF2) of the comparator CP3.

As a result, the terminal voltage of the capacitor C3 becomes the difference in voltage between the inversion input terminal potential $V1=Vr1-OF1$ of the operational amplifier iNT and the non-inversion input terminal potential $V2=Vr2+OF2$ of the comparator CP3. Therefore, the offset voltages OF1 and OF2 of the operational amplifier iNT and the comparator CP3 can be automatically compensated. The output level of the operational amplifier iNT at a time when there is no signal can be set lower than a reference level, which is the ground level in the embodiment of FIG. 4. In cases where the output of the operational amplifier iNT deflects only in one direction (a positive direction) from the output level obtained at the time when there is no signal as in this embodiment, the above arrangement to set the no signal output level of the operational amplifier iNT at a value below the ground level broadens the dynamic range of the output of the operational amplifier iNT and results in an improved S/N ratio.

After the power-up clear process, the content of the binary counter BC (see parts BC of FIGS. 5, 7 and 8) becomes "2" and the output terminal TCD1 level of the decoder TCD (see a part TCD1 of FIG. 5) changes from an L level to an H level. Then, the iRED control output level circuit iCC alternately and repeatedly becomes an H level and an L level in response to the signal produced from the output terminal JC3 of the Johnson counter JC. This causes the iRED driving circuit iRDR to intermittently drive the light projecting element iRED. The light projecting element iRED then projects a light flux on a distance measuring object via a lens, which is arranged as the lens L1 of FIG. 1. The internal temperature of the light projecting element iRED is still low immediately after it begins to light up. However, the internal temperature rises as the element is continuously lit. The light emitting energy of the light projecting element iRED gradually decreases. When the internal temperature of the light projecting element iRED becomes higher than the ambient temperature and when a so-called terminal equilibrium is attained wherein a quantity of heat which is the same as the caloric value within the light projecting element iRED is discharged to the outside, the light emitting energy of the light projecting element iRED becomes stable. Then, when the content of the binary counter BC changes from "2" to "3", the output terminal TCD3 of the decoder TCD (see a part TCD3 output level of FIG. 5) changes from an H level to an L level. The analog switch SDSC then opens and opens the closed circuit of iNT-OP3-SDSC-R12-R11-iNT. This causes the Miller integrator to begin its integrating operation. At this time, the output terminal SCL1 of the SPC controlling latch circuit SCL is at an L level while that of the other latch circuit SCL2 is at an H level. Therefore, the light receiving photo-sensitive element SPC1 alone is connected to the input terminal of the amplifier MA.

Figure 5:
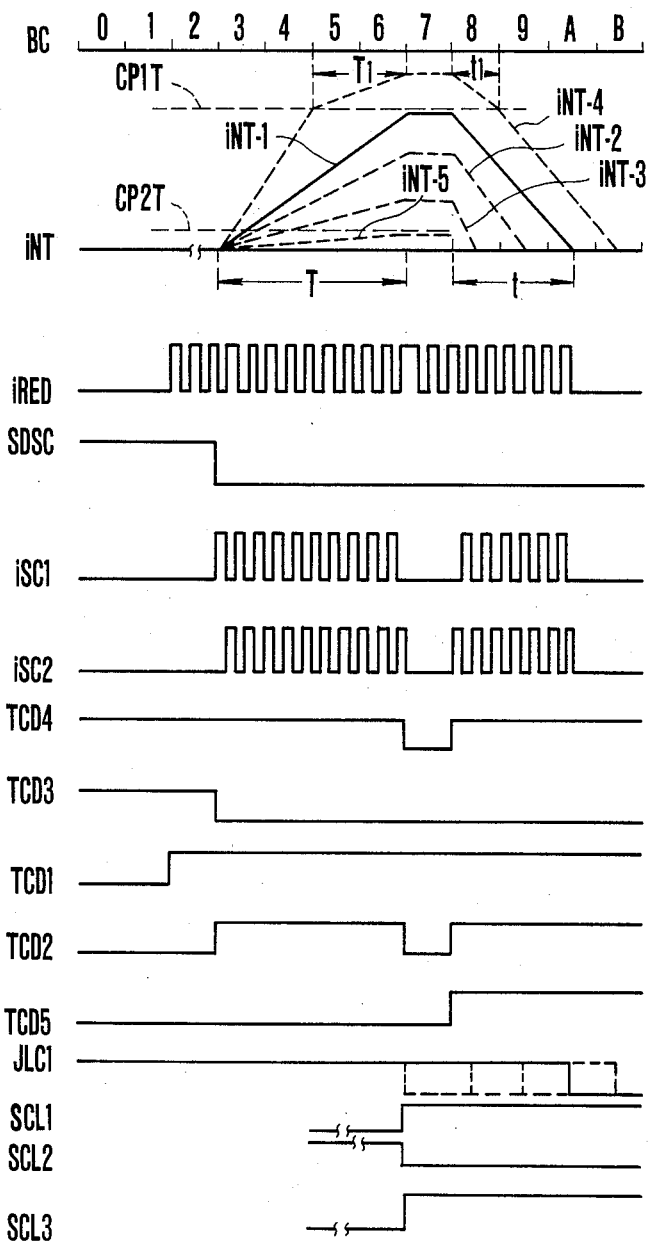

After the content of the binary counter BC is changed to "3", the integration switch control circuit iSC produces from its output terminal iSC1 pulses which are phased opposite the pulses produced from the output terminal JC1 of the Johnson counter JC (see a part iSC1 of FIG. 5). This causes the analog switch SPA to begin to open and close. The integration switch control circuit iSC also produces pulses which are close to the phase of the pulses produced from output terminal JC2 of the Johnson counter JC, as shown at a part iSC2 of FIG. 5. The pulses from the output terminal iSC2 of the circuit iSC causes the analog switch SiNV to begin to open and close.

Figure 6B:
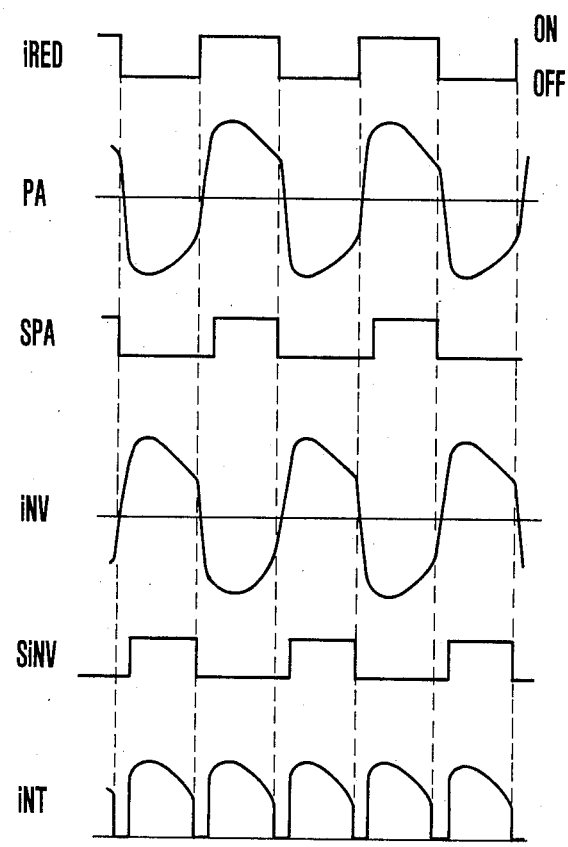

After the analog switch SDSC opens with the content of the binary counter BC having changed to "3", when a reflection light reflected by the distance measuring object as a result of light projection from the light projecting element iRED reaches the photo-sensitive element SPC1, the amplifier PA produces an output of wave form PA as shown in FIG. 6(a) based on the intensity of the incident light. Furthermore, the inverter iNV produces an output wave form as shown by the wave form iNV in FIG. 6(b). Meanwhile, the analog switches SPA and SiNV perform opening actions giving wave forms SPA and SiNV, as shown in FIG. 6(a). Therefore, the inversion input terminal of the operational amplifier iNT forms as the Miller integrator always receives a signal of a negative level, as shown at a part iNT of FIG. 6(a). Accordingly, the capacitor C3 continues to be charged during a predetermined time period T during which the content of the binary counter BC changes from "3" to "6". The terminal voltage of the capacitor C3 rises as represented by a wave form iNT in FIG. 5 based on the quantity of light incident on the photo-sensitive element SPC1. After the lapse of the predetermined time period T, the capacitor C3 is charged to a high voltage if the distance measuring object is located close by and to a low voltage if the object is located at a great distance.

When the content of the binary counter BC changes from "6" to "7" and the output terminal TCD4 level of the decoder TCD changes from an H level to an L level as represented by a wave form TCD4 in FIG. 5, the outputs of the output terminals SCL1 and SCL2 of the SPC controlling latch circuit SCL change as represented by wave forms SCL1 and SCL2 in FIG. 5. This change causes the analog switch MS1 to open and the analog switch MS2 to close. The photo-sensitive elements SPC1 and SPC2 are connected parallel to the input terminals of the amplifier MA. Furthermore, the above output change of the output terminal TCD4 of the decoder TCD causes the level of the output terminals SCL3 of the SPC controlling latch circuit to change from an L level to an H level as represented by a wave form SCL3 in FIG. 5. As a result, the iRED control circuit iCC supplies the iRED driving circuit iRDR with pulses having a phase deviating 180 degrees from the pulses produced from the output terminal JC3 of the Johnson counter JC. In synchronization with the above change in the output of the output terminal TCD4 of the decoder TCD, the level of another output terminal TCD2 changes from an H level to an L level, as represented by a wave form TCD2 of FIG. 5. Therefore, the levels of the two output terminals iSC1 and iSC2 of the integration switch control circuit iSC, which receive a signal from the output terminal TCD2, both become L levels opening the analog switches SPA and SiNV. The integrating operation of the Miller integrator is interrupted by this, so that distance measurement error due to transient variation in the amplifier MA output resulting from the switch-over between the photo-sensitive elements SPC1 and SPC2 can be prevented.

When the content of the binary counter BC changes from "7" to "8", the output terminal TCD2 output signal of the decoder TCD again changes from an L level to an H level. Then, in accordance with the output signals (iSC1 and iSC2 in FIG. 5) of the output terminals iSC1 and iSC2 of the integration switch control circuit iSC, the analog switches SPA and SiNV again repeat their opening and closing operations. However, since the phase of the pulses produced from the iRED control circuit iCC has been shifted 180 degrees at the content shift time of the binary BC from "6" to "7" as mentioned in the foregoing, the analog switch SPA opens when the light projecting element iRED lights up and the other analog switch SiNV opens when the light projecting element iRED becomes extinct (see FIG. 6(b)).

For this purpose, a voltage of a wave form iNT as shown in FIG. 6(b), which is in the positive direction, is given to the inversion input terminal of the operational amplifier iNT of the Miller integrator at the time when the content of the binary counter BC shifts to "8". The positive direction voltage given to the inversion input terminal of the operational amplifier iNT corresponds, of course, to the sum of the outputs of the photo-sensitive elements SPC1 and SPC2.

After the content shift of the binary counter BC to "8", when the above positive direction voltage is given to the operational amplifier iNT one after another, the output level of the operational amplifier iNT gradually decreases based on the input signal level of the operational amplifier iNT, that is, according to the distance to the distance measuring object as represented by the wave form iNT shown in FIG. 5. In the wave form iNT of FIG. 5, a wave form iNT-1 represents a short distance to the object ob1, ob2, a wave form iNT-2 a medium distance to the object, a wave form iNT-3 a great distance to the object and a wave form iNT-4 represent an object which is located close by and has a high reflection factor. Another wave form iNT-5 represents another situation where the object ob1, ob2 is located at a very great distance. These wave forms iNT-1, iNT-2, iNT-3 and iNT-4 respectively show the output characteristic outline of the operational amplifier iNT.

When the object ob1, ob2 distance is near and the output characteristic of the operational amplifier iNT is represented by the wave form iNT-1 of FIG. 5, the embodiment operates as follows: When the output of the operational amplifier iNT becomes lower than the threshold value of the comparator CP3, the comparator CP3 ouput level changes from an H level to an L level giving a distance measurement completion signal to the latch circuit JLC. At this time, the output terminal TCD5 level (see FIG. 5) of the timing control decoder TCD is at an H level. Therefore, in response to the distance measurement completion signal of the comparator CP3, the latch circuit JLC supplies an L level output signal (see JLC1 of FIG. 5) to the iRED control circuit iCC, the integration switch control circuit iSC, the comparator CP3, the AND gate AND and the distance measurement zone judging decoder ZJD. This stops the light projecting operation of the light projecting element iRED (see iRED of FIG. 5). Both the analog switches SPA and SiNV (see iSC1 and iSC2 of FIG. 5). The integrating operation of the Miller integrator stops. The comparator CP3 also stops operating. The AND gate AND output level changes from an H level to an L level blocking pulse transmission from the counter JC to the frequency dividing circuit DiV. Therefore, the binary counter BC retains the value "A" which is obtained when the above distance measurement completion signal is produced from the comparator CP3. The distance measuring zone judging decoder ZJD receives the value "A" retained at the binary counter BC. At this time, since an L level signal has been supplied from the latch circuit JLC to the decoder ZJD in response to the distance measurement completion signal from the comparator CP3, the distance measuring zone judging decoder ZJD transmits information on the object ob1, ob2 distance to an external interface circuit (a circuit within a camera in this embodiment) on the basis of information from the binary counter BC. The computing operation of the distance measuring zone judging decoder ZJD is performed as described below:

As is apparent from the wave form iNT shown in FIG. 5, during the upward integrating process (integration time T), the charge voltage of the capacitor C3, which forms the Miller integrator, is equal to the dropping voltage of the capacitor C3 obtained during the downward integrating process (integration time t). Therefore, there is obtained the following relation:

$$\frac{a \cdot A \cdot T}{C3 \cdot R11} = \frac{a(A+B)t}{C3 \cdot R11} \quad (1)$$

$$t = \frac{A}{A+B} T \quad (2)$$

In these formulas: C3 represents the capacity of the capacitor C3; R11 the resistance value of the input resistor R11; A the output current value of the photo-sensitive element SPC1; B the output current value of the photo-sensitive element SPC2; T the upward integrating time mentioned in the foregoing; t the downward integrating time; α a proportional constant determined by the product of the current-to-voltage converting constant of the operational amplifier MA, the amplification factor of the operational amplifier PA, and also by the opening and closing duty ratio of the analog switches SPA and SiNV.

The formula (2) given above indicates that, if the integrating time T does not vary, the object ob1, ob2 distance can be determined as A/A+B by measuring the other integrating time t. The distance computing operation of the distance measuring zone judging decoder ZJD is based on this principle. More specifically, the integrating time t is obtained by computation from the value "A" supplied from the binary counter BC. Then, the value of A/A+B is obtained from the known predetermined time T. With the object ob1, ob2 distance thus computed, information on the object ob1, ob2 distance is supplied to the external interface circuit.

Furthermore, if the object ob1, ob2 is located at a medium distance, the above distance measurement completion signal is produced when the content of the counter BC is at "9". In that event, the distance measuring zone judging decoder ZJD produces a signal indicating that the object ob1, ob2 is at a medium distance. Furthermore, if the object ob1, ob2 is located at a great distance, the comparator CP3 produces the distance measurement completion signal when the content of the binary counter BC is at "8". Then, the distance measuring zone judging decoder ZJD produces a signal indicating that the object is located at a great distance.

In the event of an extremely great object distance, the output level of the Miller integrator does not exceed threshold value CP2T (see the wave form iNT of FIG. 5) even when the content of the binary counter BC shifts to "7", as shown by the integrating characteristic wave form iNT-5 in FIG. 5. In this case, when the output terminal TCD4 level of the timing control decoder TCD changes from an H level to an L level, the latch circuit JLC latches an L level signal produced from the comparator CP2 in synchronization with this level change. As a result, the output level of the latch circuit JLC changes from an H level to an L level in synchronization with the output level change from the output terminal TCD4 of the decoder TCD in the same manner as in the above normal object ob1, ob2 distance range (see JLC1 of FIG. 5). Then, light projection by the light projecting element iRED stops. The content of the binary counter BC is kept at "7". The distance measuring zone judging decoder ZJD judges that the object is located at an extremely great distance from the content "7" of the binary counter BC together with the output signal of the latch circuit JLC and, thus, produces an indicative signal and supplies it to an external interface circuit EiC.

If the object ob1, ob2 is located close up and is highly reflective, the embodiment operates as follows: In this instance, the Miller integrator output voltage rapidly rises after commencement integration based on the output current of the photo-sensitive element SPC1, as represented by the integration characteristic wave form iNT-4 in FIG. 5. When the output voltage of the Miller integrator exceeds threshold value CP1T of the comparator CP1 (see a wave form iNT of FIG. 7), the comparator CP1 output changes from an L level to an H level (see a wave form CP1 of FIG. 8). The output of the compression signal wave-form shaping circuit CSC then changes from an H level to an L level, as shown by a wave form CSC in FIG. 8. As a result, the pulses produced from the output terminals iSC1 and iSC2 of the integration switch control circuit iSC are thinned out by the pulses from the integration interval decoder iiD (see iiD1 of FIG. 9) into thinned-out pulse trains, as shown by the wave forms iSC1 and iSC2 in FIG. 7. The thinned-out pulse trains are supplied to the analog switches SPA and SiNV. The analog switches SPA and SiNV open and close in response to the pulse trains. Therefore, the output voltage of the operational amplifier iNT, which forms the Miller integrator, gradually rises as shown in FIG. 5.

When the content of the binary counter BC shifts to "7", the analog switches SPA and SiNV open in response to the L level signal produced from the output terminal TCD2 of the timing control decoder TCD in the same manner as in the situation described above. This blocks the charging route for the capacitor C3, stopping the integrating operation of the Miller integrator.

When the content of the binary counter BC shifts to "8", the output level of the output terminal TCD2 of the timing control decoder TCD again changes from an L level to an H level (see wave form TCD2 of FIG. 5). Then, the output terminals iSC1 and iSC2 of the integration switch control circuit iSC again supply the analog switches SPA and SiNV with the thinned-out pulses, as shown by the wave forms iSC1 and iSC2. These analog switches SPA and SiNV perform opening and closing operations resuming the integrating operation. The output of the operational amplifier iNT, which forms the integrator, gradually drops based on the sum of the output currents of the photo-sensitive elements SPC1 and SPC2, assuming that the slant of the integrating characteristic during the period T1 (see iNT of FIG. 5) is K·A, at a gradient $-K(A+B)$ as shown by the wave form iNT of FIG. 7 and the wave form iNT-4 of FIG. 5. Then the output of the Miller integrator dropped further. When it becomes lower than the threshold value CP1T of the comparator CP1 (see wave form iNT of FIGS. 5 and 7), the comparator CP1 output lever changes from an H level to an L level. This changes the output level of the compression signal wave-form shaping circuit CSC from an L level to an H level (see the wave form CSC of FIG. 8). As a result, the duty ratio of the pulses produced from the output terminals iSC1 and iSC2 of the integration switch control circuit iSC returns to its original state. Therefore, the output of the Miller integrator rapidly drops, as shown by the wave form iNT-4 of FIG. 5. When the output, i.e. the output voltage of the operational amplifier iNT, becomes lower than the threshold value of the comparator CP3, the output level of the comparator CP3 changes to an L level inserting thereby the output level of the distance measurement completion judging and latch circuit JLC (see the wave form JLC1 of FIG. 5). This stops the light projecting operation of the light projecting element iRED in the same manner as in the situation described above. Then, the distance measuring zone judging decoder ZJD supplies the external interface circuit EiC with distance information corresponding to the content "B" of the binary counter BC, i.e. a signal indicating that the ob1, ob2 object is located very close. When the object is located close by and reflected light from the object ob1, ob2 is highly intensive, the output of the operational amplifier iNT is compressed in a manner as described above. Furthermore, in accordance with the arrangement of this embodiment, very accurate distance measurement can be attained even when a light emitting element, having a delay characteristic as described above, is employed as the light projecting element iRED.

Figure 10:
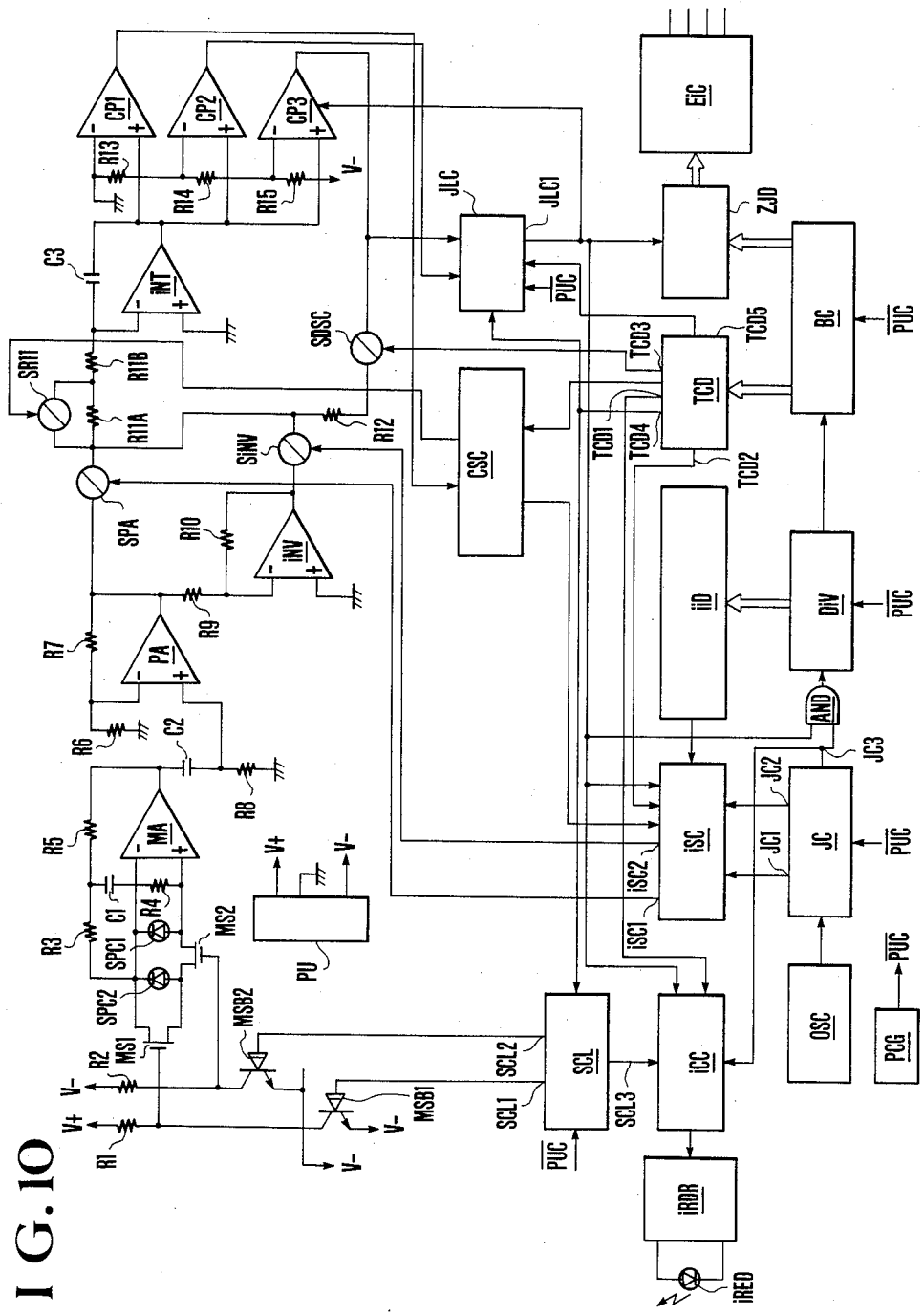
FIG. 10 is a circuit diagram showing the circuit arrangement of a second embodiment of the invention.

FIG. 10 is a circuit diagram showing the circuit arrangement of a second embodiment of this invention. In FIG. 10, the same circuit elements as those shown in FIG. 4 are indicated by the same reference symbols and numerals as those used in FIG. 4 and are omitted from the description given below:

In this embodiment, the compressed signal is obtained through resistors R11A and R11B connected to the inversion input terminal of the operational amplifier iNT and an analog switch SR11 connected to both terminals of the resistor R11A.

The second embodiment, which is arranged as shown in FIG. 10, operates as follows: A light projecting operation is performed on the object ob1, ob2 by the light projecting element iRED. Then, reflected light thus obtained from the object ob1, ob2 is detected by the photo-sensitive element SPC1. The signal level produced from the operational amplifier iNT rises. The comparator CP1 output level changes from an L level to an H level. The compression signal wave-form shaping circuit CSC produces a signal which turns off the analog switch SR11. The time constant of the Miller integrator, which is composed of the operational amplifier iNT, the capacitor C3 and the resistors R11A and R11B, increases to effect compression.

FIG. 11 shows the circuit arrangement of a third embodiment of the invention. The same circuit elements as those shown in FIG. 10 in the second embodiment are indentified by the same reference symbols and numerals. In the third embodiment shown in FIG. 11, an analog switch SR7 is connected to both terminals of a resistor R7B which is in series with a resistor R7 provided in the feedback loop of the operational amplifier PA shown in FIG. 10. Having performed a distance measuring operation, if the comparator CP1 output level is low (L), the compression signal wave-form shaping circuit CSC turns the analog switch SR7 off in the event of no compression. In that event, the operational amplifier PA gain increases. When the comparator CP1 output level changes from an L level to an H level, the analog switch SR7 turns on. The operational amplifier PA gain then decreases, compressing its input signal.

Figure 12:
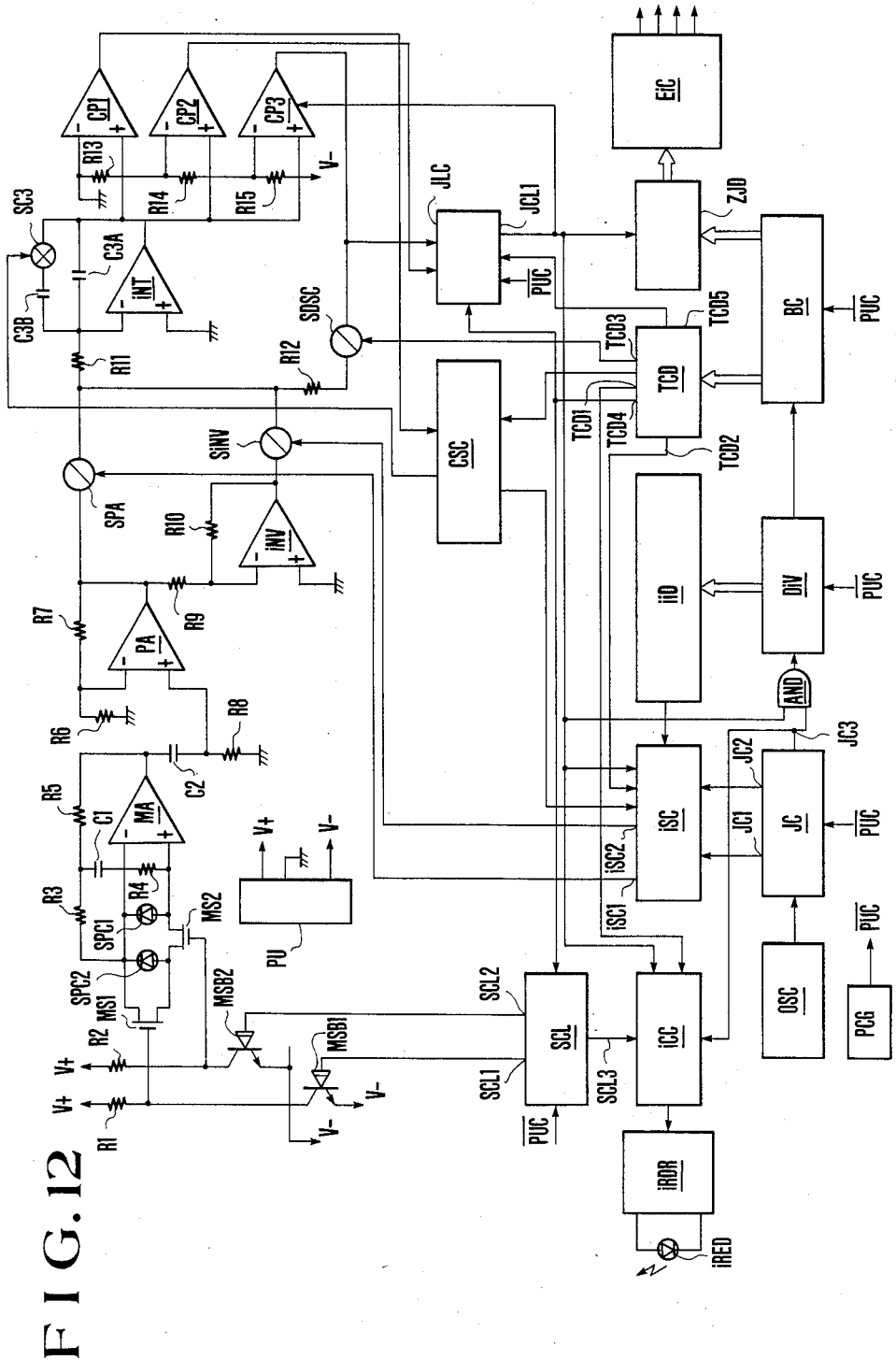
FIG. 12 is a circuit diagram of a fourth embodiment of the invention.

FIG. 12 shows the circuit arrangement of a fourth embodiment of the invention. The same circuit elements as those shown in FIG. 4 for the first embodiment are identifies by the same reference symbols and numerals. In the fourth embodiment shown in FIG. 12, a capacitor C3B is in parallel with the capacitor C3 of FIG. 4. An analog switch SC3 short-circuits the two terminals of the capacitor C3B.

With a distance measuring operation performed, if the output of the comparator CP1 is at an L level, the compression signal wave-form shaping circuit CSC turns on the analog switch SC3, short-circuiting the capacitor C3B to permit a normal integrating operation. The output signal level of the operational amplifier iNT then increases. The output level of the comparator CP1 changes from an L level to an H level. The compression signal waveform shaping circuit CSC turns off the analog switch SC3, placing the capacitor C3B in parallel with the capacitor C3. This increases the time constant of the Miller integrator and an input signal is compressed. In this embodiment, switch-over between upward integration and downward integration is carried out by shifting the light emission signal phase of the light projecting element iRED by 180 degrees based on upward or downward integration. However, this, of course, may be accomplished by respectively varying the driving signal phases of the integration switch control circuit for the integration switches SPA and SiNV.

Furthermore, in this embodiment, a single compressing level is set. However, a similar computing operation can also be carried out by setting a plurality of compressing levels and by respectively varying their compressing ratios. In another possible arrangement, the resistor R11 is replaced with an FET which has its gate connected to the output terminal of the operational amplifier iNT. Resistance between the drain and source of the FET is controlled by the gate voltage continuously varying the compressing level non-stepwise.

The embodiment includes the photo-sensitive elements SPC1 and SPC2 arranged as light receiving means in the same shape as those shown in FIG. 2. However, they, of course, may be arranged in some other shape or may be replaced with some other known semiconductor position sensing elements PSD, etc. The light receiving means SPC1 and SPC2 produce two different signals. This arrangement, of course, may be arranged in different ways as long as the light receiving means SPC1, SPC2 produces a plurality of signals varying in opposite warp based on the incident position of the reflection light, which by the light projecting means iRED comes from the distance measuring object and varies depending on the light receiving means. Furthermore, in this particular embodiment, the two signals of the light receiving means are produced in a time serial manner. However, they, of course, may be produced in a different manner. In accordance with the arrangement of the embodiment, the ratio of two signals, which vary with the incident angle of the reflected light from the object ob1, ob2, can be computed within a short time period by a small and simple circuit arrangement unlike the large and complex circuit previously required by the prior art for distance measurement. When the arrangement of this embodiment is applied to a compact apparatus such as its a camera using a battery as power source, a sufficient dynamic range can be obtained from the battery voltage without recourse to a booster circuit, so that focusing can be accomplished accurately.

FIGS. 13 and 14 show examples in which the use of the photo-sensitive elements SPC1, SPC2 in the embodiment shown in FIG. 4 is replaced with a known semiconductor position sensor element PSD. Referring to FIG. 13, an operational amplifier OP corresponds to the operational amplifier MA of FIG. 4. A negative feedback circuit network FC corresponds to the arrangement of the resistors R3–R5, the capacitors C1, etc. of FIG. 3. The semiconductor position sensor PSD is provided with signal electrodes "a" and "b" and a common electrode "c". A switch SWB is opened and closed during a sequence of distance measuring processes. A semiconductor switch, a mechanical switch or the like may be used as the switch SWB in the same manner as the switches MS1 and MS2 of the embodiment shown in FIG. 4. Reference symbols Vref1 and Vref2 identify reference potentials. In FIG. 13, the reference potential Vref1 is impressed on the signal electrode "b" when the switch SWA is opened and the switch SWB is closed. As previously known, the semiconductor position sensor PSD is arranged such that, when a bias voltage is impressed on one of the signal electrodes, the other signal electrode produces a signal current (corresponding to the output A of the photo-sensitive element SPC1 of FIG. 4), which has a value corresponding to the incident position of an object reflection light flux on the surface of the sensor PSD between the electrodes "a" and "b". Furthermore, when the switch SWA is closed and the switch SWB opened, one of the electrodes of the sensor PSD is opened. This causes a total light receiving output which is the sum of the output A of the electrode "a" and the output B of the electrode "b" which is produced from the electrode "a". The sum signal A+B of the outputs of the photo-sensitive elements SPC1 and SPC2 of the embodiment shown in FIG. 4 is obtained. The swich SWA is kept open and the switch SWB closed until the count value of the binary counter BC of FIG. 4 becomes "6". Then, the switch SWA is closed and the other switch SWB is opened when the count value becomes "7". With control performed in this manner, a count value corresponding to the object ob1, ob2 distance can be obtained at the binary counter BC in exactly the same manner as the embodiment shown in FIG. 4.

FIG. 14 shows a modification of the example of FIG. 13. In FIG. 14, the same components as those shown in FIG. 13 are indentified with the same reference symbols. In this case, the use of the switch SWA of FIG. 13 is omitted while the other switch SWB is replaced with a switch SWC. The output A is obtained by closing the switch SWC. Then, another output A+B is obtained by opening the switch SWC. This is a point at which this modification differs from the example shown in FIG. 13.

In the embodiment shown in FIG. 4, the output A/A+B is obtained by detecting the output A of the photo-sensitive element SPC1, which is one of the two photo-sensitive elements. It is, of course, possible to obtain an output B/A+B by detecting the output B of the photo-sensitive element SPC2 instead of that of the other element SPC1. However, this arrangement detects the output of one of the photo-sensitive elements SPC1 which produces a larger output for a greater object distance than the other element SPC2 (hereinafter the former will be called the far distance photo-sensitive element, the former being the element SPC1 in the embodiment shown in FIG. 4) gives the following advantages:

(1) The light quantity reflected from an object and incident on a light receiving system follows approximately the inverse square law of light propagation for the object ob1, ob2 distance. Therefore, the quantity of light incident on the very distant photo-sensitive element SPC1 with the object located at a great distance less than the quantity of light incident on the other photo-sensitive SPC2 element (hereinafter called the near distance photo-sensitive element) with the object ob1, ob2 located near by. The output of the far distance photo-sensitive element SPC1, thus, has a narrower dynamic range than the output of the near distance photo-sensitive element SPC2. In view of this, having the output of the far distance photo-sensitive element SPC1 detected permits a more accurate signal processing operation, although the dynamic range of the signal processing circuit is narrow.

(2) With the shape of the photo-sensitive elements SPC1, SPC2 arranged as shown in FIG. 2, the output of the near distance photo-sensitive element SPC2 becomes considerably smaller when the object to be photographed is at a great distance. Therefore, if the output of the near distance photo-sensitive element SPC2 is detected in that event, the object ob1, ob2 might be judged as being at infinity while the object ob1, ob2 is not actually located at that distance. Therefore, the arrangement in which the output of the far distance photo-sensitive element SPC1 detected gives a higher degree of accuracy in determining an infinite distance.

The same advantages (1) and (2) can also be obtained in the use of the semiconductor position sensor PSD by using the output of the signal electrode which produces a large output when the object ob1, ob2 is located at a great distance.

In accordance with the invention, modifications of the embodiments which have been described in the foregoing can be made in various manners without departing from the spirit and scope of the invention. The invention is also applicable to a so-called passive type distance measuring device which has no light projecting means and, for example, to such a system that detects a focused condition by comparing level signals resulting from a contrast difference between object images respectively incident on two photo-sensitive elements SPC1, SPC2 close to a focal plane. Unlike this embodiment, it is impossible to have signals of opposite polarities produced in time series by varying the synchronous phase of synchronous rectification when using the passive type device. In that event, however, it is possible for the polarity of a signal in a first mode to be opposite that of a signal in a second mode by oppositely connecting the signal generating parts of the photo-sensitive elements SPC1, SPC2 as shown in FIG. 15. FIG. 15 shows such an arrangement, omitting the operational amplifier MA of FIG. 4 and the elements around it. When the switch SWA is on and another switch SWB is off, a signal light incident on a photo-sensitive element SPCA causes the output of an operational amplifier OP1 to deflect in the direction of one polarity via a negative feedback FC1. If the switch SWB is on and the switch SWA is off, the output deflects in the direction of the opposite polarity. It is also possible to change the polarity of the signal in each of the time shared modes by providing an inverter circuit in a signal route and by rendering it operative or inoperative.

A time sharing arrangement for the plurality of information generating means can be controlled not only by an electrical method but also by a mechanical method. As to the method for switch-over from one information generating means to another, the method of directly shifting the connections of the photo-sensitive elements SPC1, SPC2 as employed in this embodiment is advantageous where the circuit also serves as a processing circuit for the purpose of reducing the circuit scale and preventing degradation of detecting accuracy due to inadequate coordination between circuits. However, this method, of course, may be replaced with another arrangement in which, as shown in FIG. 16, these photo-sensitive elements SPC1, SPC2 are provided with different input circuits, which have their outputs switched from one to the other. Referring to FIG. 16 which corresponds to the block 1 of FIG. 3, the illustration includes operational amplifiers OP2 and OP3; photo-sensitive elements SPCC and SPCD; negative feedback circuits FC2 and FC3; and switching means SWC. The embodiment shown in FIG. 16 necessitates some contrivance for obtaining the sum of the outputs of the two photo-sensitive elements SPCC, SPCD, as in the embodiment of FIG. 4. However, the arrangement of this example is sufficient in a system not absolutely requiring a proportional relation between a photo-taking lens drawing out extent and the computation result. With the computing function of the Miller integrator of FIG. 4 in combination with an information generating means such as the one shown in FIG. 16, a result obtained from the combination can be processed either as an incident light quantity ratio of the two photo-sensitive elements SPCC, SPCD or simply as a difference computed or a result of value comparison.

In the embodiment shown in FIG. 4, the light receiving means consists of two silicon photo-sensitive elements with a common cathode. However, in accordance with this invention, the light receiving means is not limited to such an arrangement. The arrangement of input circuits and photo-sensitive elements shown in Japanese Patent Application No. SHO 58-29076 can be employed in accordance with the invention. Particularly, the use of the semiconductor position sensor (hereinafter called PSD) enhances the accuracy of the embodiment by virtue of the analytical high resolution of the semiconductor position sensor PSD.

Figure 17:
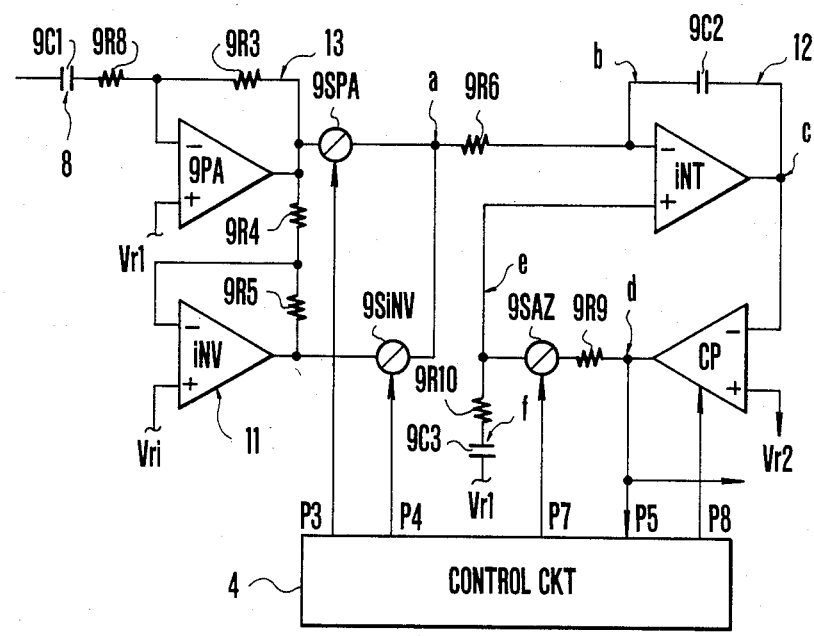
FIG. 17 is a circuit diagram showing another embodiment of the invention.

FIG. 17 shows another embodiment of the invention. This embodiment is arranged in almost the same manner as the embodiment shown in FIG. 4. Therefore, the following description covers only the difference between this embodiment and the embodiment shown in FIG. 4. In this case, a coupling capacitor 9C1 which is connected to the output terminal of the operational amplifier MA of FIG. 4 alone forms a high-pass filter 8. An operational amplifier 9PA and resistors 9R3 and 9R8 jointly form an inversion amplifier 13, which has an amplification factor of $-9R3/9R8$. An analog switch 9SA connects the output terminal of a comparator CP to the non-inversion input terminal of an operational amplifier iNT via a resistor 9R9. The embodiment includes the circuits OSC, JC, DiV, BC, TCD, iiD, iSC, iCC, SCL, etc., which are arranged in the same manner as those shown in FIG. 4. These elements are under the control of a control signal P7 produced from the control circuit 4. The non-inversion input terminal of the operational amplifier iNT is connected to a series circuit consisting of a resistor 9R10 and an offset compensating capacitor 9C3. The offset compensating capacitor 9C3 has a reference voltage Vr1 impressed on the other terminal thereof. The output terminal of the operational amplifier iNT is connected to the inversion input terminal of the comparator CP. The comparator CP has another reference voltage Vr2 which is lower than the reference voltage Vr1 impressed on the non-inversion input terminal. Assuming that the input offset voltage of the comparator CP is $V_{OFCP}$, the threshold value of the comparator CP becomes $Vr2+V_{OFCP}$. The comparator CP normally operates upon receipt of a high level control signal P8 from the control circuit 4 and stops operating when the control signal P8 changes to a low level.

Figure 19:
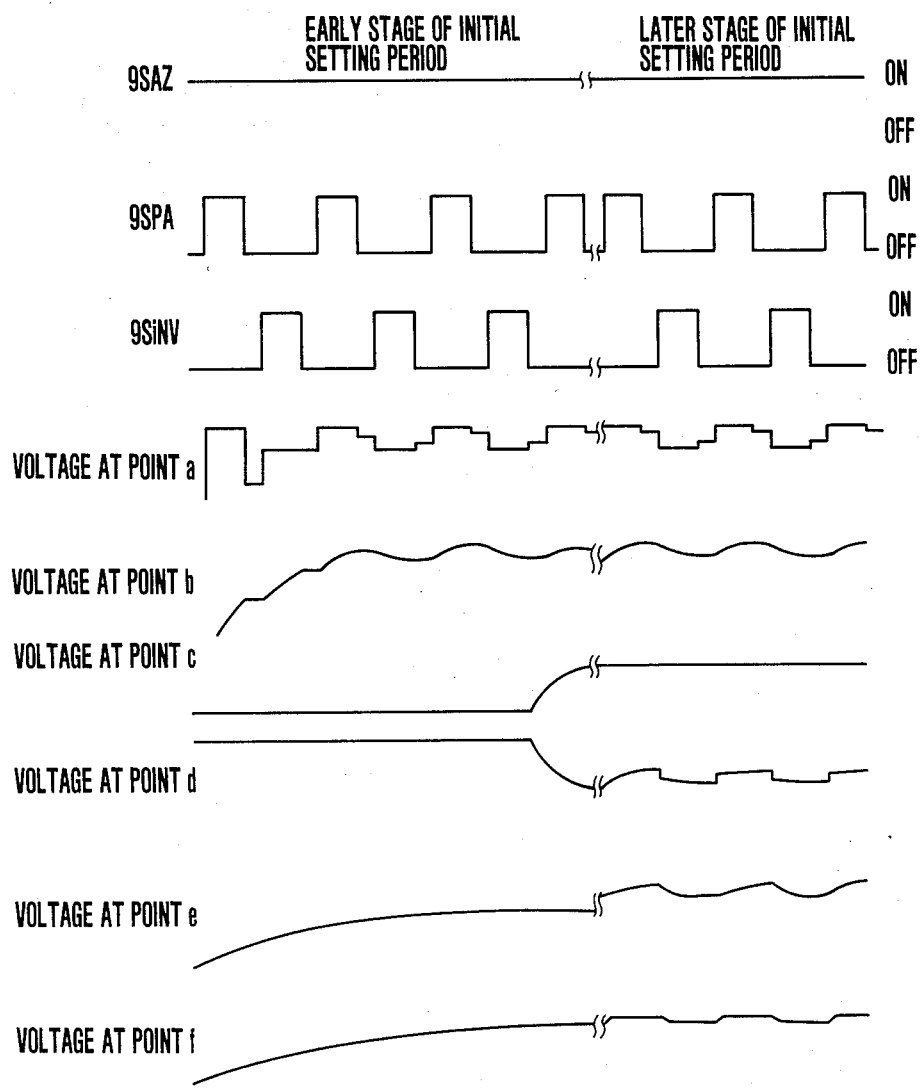
FIG. 19 is a wave form chart showing voltage wave forms of outputs of various parts of an embodiment of the invention.

Referring to FIGS. 18 and 19, the embodiment shown in FIG. 17 operates as follows: With the power supply switch closed, an initial setting period begins. The control circuit 4 then turns on an analog switch 9SAZ by means of the control signal P7. Then, clock signals generated within the control circuit 4 cause analog switches 9SPA and 9SiNV to alternately turn on and off repeatedly in the same phase relation as the phase relation obtained within a predetermined integration time T as shown in FIG. 18. During the initial setting period (see FIG. 18), the light projecting element 1 remains extinct. The comparator CP is normally operative with the high level control signal P8 supplied thereto.

Since there is no signal during the initial setting period, the output of an inversion amplifier 13 is $Vr1+V_{OFPA}$ during this period and the output of another inversion amplifier 11 is $Vr1+2V_{OFiNV}-V_{OFPA}$, wherein $V_{OFPA}$ represents the input offset voltage of the operational amplifier 9PA and $V_{OFiNV}$ represents the input offset voltage of the operational amplifier iNV. Therefore, with the analog switches 9SPA and 9SiNV operating, the voltages of $Vr1+V_{OFPA}$ and $Vr1+2V_{OFiNV}-V_{OFPA}$ are alternately given to a circuit point, as shown in FIG. 17. Assuming that the voltage stored at the capacitor 9C2 immediately before the power supply is swiched on is $V_{C2i}$, the input offset voltage of the operational amplifier iNT is $V_{OFiNT}$ and the voltage of the non-inversion input terminal of the operational amplifier inV (a point "e" of FIG. 17) immediately after the power supply is switched on is Vei. The voltage of the output terminal of the integrator 12 (a point "c" in FIG. 17) immediately after the power supply is switched on becomes $Vei+V_{C2i}+V_{OFiNT}$. If the voltage at the point "c" is lower than the threshold value $Vr2+V_{OFCP}$ of the comparator CP, the voltage level of the output terminal of the comparator CP (a point "d" of FIG. 17) becomes a high level. Then, the offset compensating capacitor 9C3 is charged. The voltages of the non-inversion and inversion input terminals of the operational amplifier iNT (points "e" and "b" of FIG. 17) rise. The voltage of the point "c" also rises. Conversely, if the voltage of the point "c" is higher than the threshold value $Vr2+V_{OFCP}$, the voltage level of the point "d" becomes low, causing the offset compensating capacitor 9C3 to be discharged via the resistors 9R10 and 9R9. The voltages of the points "e" and "b" then drop. As a result, the voltage of the point "c" also drops. The voltage of the point "c" is thus stabilized in this manner at a value $Vr2+V_{OFCP}$. FIGS. 18 and 19 show that the voltage of the point "c" immediately after the power supply is swiched on is lower than the threshold value $Vr2+V_{OFCP}$ and that the voltage of the point "c" becomes stable after it rises to the value $Vr2+V_{OFCP}$ in the early stage of the initial setting period.

As mentioned above, the voltages of values $Vr1+V_{OFPA}$ and $Vr1+2V_{OFiNV}-V_{OFPA}$ are alternately impressed on the point "a". Therefore, the capacitor 9C2 is discharged via the resistor 9R6 when the voltage of the point "b" is higher than that of the point "a" and is charged via the resistor 9R6 when the voltage of the point "b" is lower than that of the point "a". In this manner, the voltage of the point "b" becomes closer to the reference voltage Vr1. At the same time, the voltages of the points "d", "e" and "f" also approach the reference voltage Vr1 until they become stable. Further details of this stabilized condition are as follows:

In the stabilized condition, the voltage of the point "c" is fixed at the value of Vr2+$V_{OFCP}$. Therefore, the voltage wave form of the point "b" becomes a wave form obtained from the voltage wave form of the point "a" after it has passed through a low-pass filter formed by the resistor 9R6 and the capacitor 9C2. The voltage of the point "e" has a wave form obtained by subtracting the input offset voltage $V_{OFiNT}$ from the voltage of the point "b". The voltage of the point "d" has a wave form that causes the point "e" to have the above voltage. The voltage wave form of the point "f" becomes a wave form obtained by having the voltage wave form of the point "e" pass through a low-pass filter jointly formed by the resistor 9R10 and the offset compensating capacitor 9C3. Accordingly, assuming that the frequency of an alternating transmission function $H_A$ for a part from the point "a" through the point "f" is "f", the alternating transmission function $H_A$ can be expressed as follows:

$$H_A(f) = \frac{1}{j2\pi f 9C_2 9R6 + 1} \cdot \frac{1}{j2\pi f 9C_3 9R10 + 1}$$

In cases where a relation of $f >> \frac{1}{2}\pi 9C_2 9R6$ or $f >> \frac{1}{2}\pi 9C_3 9R10$ is obtained, the voltage of the point "f" remains at a fixed value if an alternating wave form is impressed on the point "a". Assuming that the duties (the rate of the length of time during which the switches are on within one cycle) of the analog switches 9SPA and 9SiNV are Dp and Di, the above fixed value $V_{c3c}$ can be expressed as follows:

$$V_{c3c} = \frac{1}{Dp + Di} \{Dp(Vr1 + V_{OFPA}) + Di(Vr1 + 2V_{OFiNV} - V_{OFPA})\} - V_{OFiNT}$$

$$= Vr1 + Dp \cdot \frac{V_{OFPA}}{Dp + Di} + Di \cdot \frac{2V_{OFiNV} - V_{OFPA}}{Dp + Di} - V_{OFiNT}$$

After this condition has been attained, when the analog switches 9SPA, 9SiNV and 9SAZ are turned off, the offset compensating capcitor 9C3 stores and retains the voltage that causes the voltage of the point "f" to become $V_{c3c}$.

Then, the driving circuit iRDR (see FIG. 4) begins to flicker the light projecting element iRED (see FIG. 4). After the lapse of a stand-by time required before the light projecting element iRED arrives at a thermally stable condition as described in the embodiment shown in FIG. 4, the analog switches 9SPA and 9SiNV again operate and an integrating operation is carried out. During a predetermined integrating time T, a signal corresponding to the signal A which is produced from the photo-sensitive element SPC1 of FIG. 4 is integrated in the positive direction. Then, after a pause, a signal corresponding to the sum signal A+B of the signals of the photo-sensitive elements SPC1 and SPC2 is integrated in the negative direction. The distance to the object ob1, ob2 to be photographed is measured by this operation as mentioned in the foregoing.

In the computing processing circuit shown in FIG. 17, the integrator 12 operates to have the inversion input terminal of the operational amplifier iNT (the point "b") retain a voltage of the value ($V_{c3c}+V_{OFiNT}$). The result of the integrating operation, therefore, can be expressed as follows:

$$\frac{T8}{9R_6 9C_2} [Dp\{(Vr1 + V_{OFPA} + S) - (V_{c3c} + V_{OFiNT})\} +$$

$$Di\{(Vr1 + 2V_{OFiNV} - V_{OFPA} + S) - (V_{c3c} + V_{OFiNT})\} =$$

$$\frac{T8}{9R_6 9C_2} (Dp + Di)S$$

The integration result thus becomes a value precisely proportional to the signal component obtained. Therefore, the input offset voltage of each of the operational amplifiers PA, iNV and iNT can be ignored. By virtue of this advantage, an operational amplifer arrangement using an FET input, particularly an MOS type FET input, which has an excessively large input offset even voltage though the input bias current thereof is very small, can be employed as the operational amplifier iNT in accordance with the arrangement of this embodiment. According to the arrangement of this embodiment, the input bias current of the operational amplifier iNT can be minimized to eliminate any error due to the input bias current.

Figure 20:
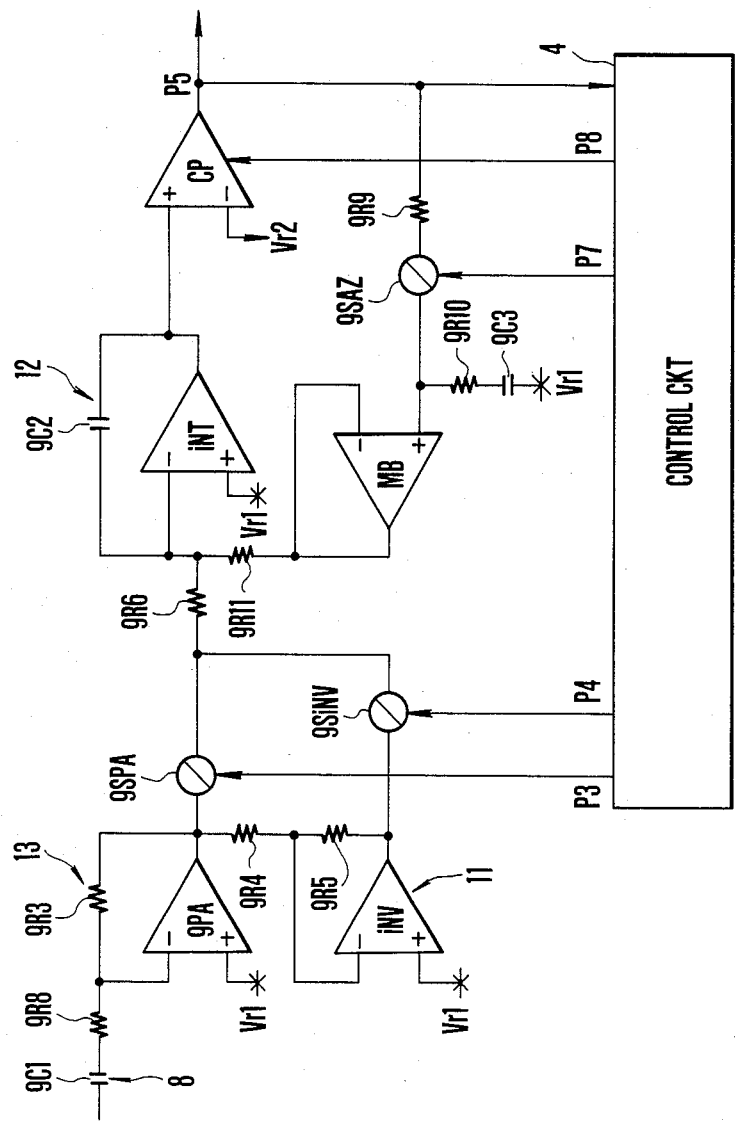
FIG. 20 is a circuit diagram showing a tenth embodiment of the invention.

FIG. 20 shows another embodiment of the invention. In the preceding embodiment shown in FIG. 17, the voltage of the non-inversion input terminal of the operational amplifier iNT is controlled. Whereas, in this embodiment, the adverse effect of the input offset voltage is eliminated by controlling the integrated current. During the initial setting period, if a current is flowing into the capacitor 9C2 via the resistor 9R6, the output voltage level of the integrator 12 drops. As a result, the output of the comparator CP suddenly drops at a point around the threshold value Vr2−$V_{OFCP}$ of the comparator CP or, when it becomes lower than the threshold value, it drops to the voltage of the negative power source of the comparator CP. Since the analog switch 9SAZ is on during the initial setting period, the offset compensating capacitor 9C3 is discharged. The output of a buffer MB, which has its input part formed by an MOS type FET, drops. As a result, a current flows out of the inversion input terminal of the operational amplifier iNT via the resistor 9R11. This decreases an integration current flowing from the resistor 9R6 to the capacitor 9C2. Then, on the average, eventually no current flows to the capacitor 9C2. In the event of a current flow from the capacitor 9C2 to the resistor 9R6, the average current flowing to the capacitor 9C2 also becomes zero.

At this time, the output voltage $V_{MO}$ of the buffer MB becomes:

$$Vr1 + V_{OFiNT} - \frac{9R11}{9R6} \{Dp(V_{OFPA} - V_{OFiNT}) +$$

$$Di(2V_{OFiNV} - V_{OFPA} - V_{OFiNT})\}$$

and the voltage of the non-inversion input terminal of the buffer MB becomes $V_{MO}-V_{OFMB}$, wherein $V_{OFMB}$ represents the input offset voltage of the buffer MB.

In the embodiment shown in FIG. 20, the inversion amplifier 11 and the analog switch 9SiNV are provided for full-wave rectification of the AC voltage signal. In the event of half-wave rectification, however, the embodiment dispenses with the amplifier 11 and the switch 9SiNV. Furthermore, the integrator 12 integrates a signal corresponding to the signal A in one direction and oppositely integrates a signal corresponding to the signal A+B. Then the integrator may unidirectionally integrate a known signal during a period T−t. In that case, the integrated value of the known signal becomes proportional to B/(A+B), so that the object ob1, ob2 distance can be obtained in an analog value.

Furthermore, a voltage which is the same as the reference voltage Vr1 of the operational amplifiers 9PA and iNV is impressed on one terminal of the offset compensating capacitor 9C3. However, this voltage does not have to be the same as the reference voltage Vr1 but may be of a different value which is in a constant ratio to the latter. With the embodiment modified in this manner, when the circuit has an IC (an integrated circuit) with the offset compensating capacitor 9C3 disposed on the outside thereof, for example, the modification deletes the necessity of taking out the reference voltage Vr1 as a terminal output of the IC, so that the embodiment has a lower cost and a greater latitude for design work. However, in that event, use of a voltage very different in potential from the reference voltage Vr1 tends to bring about dielectric absorption or a current leak from the capacitor 9C3, which is an adverse effect. Therefore, in the event of a requirement for a high degree of accuracy, the capacitor 9C3 to be employed for the offset compensating purpose must be closely examined for the above characteristics.

Figure 21:
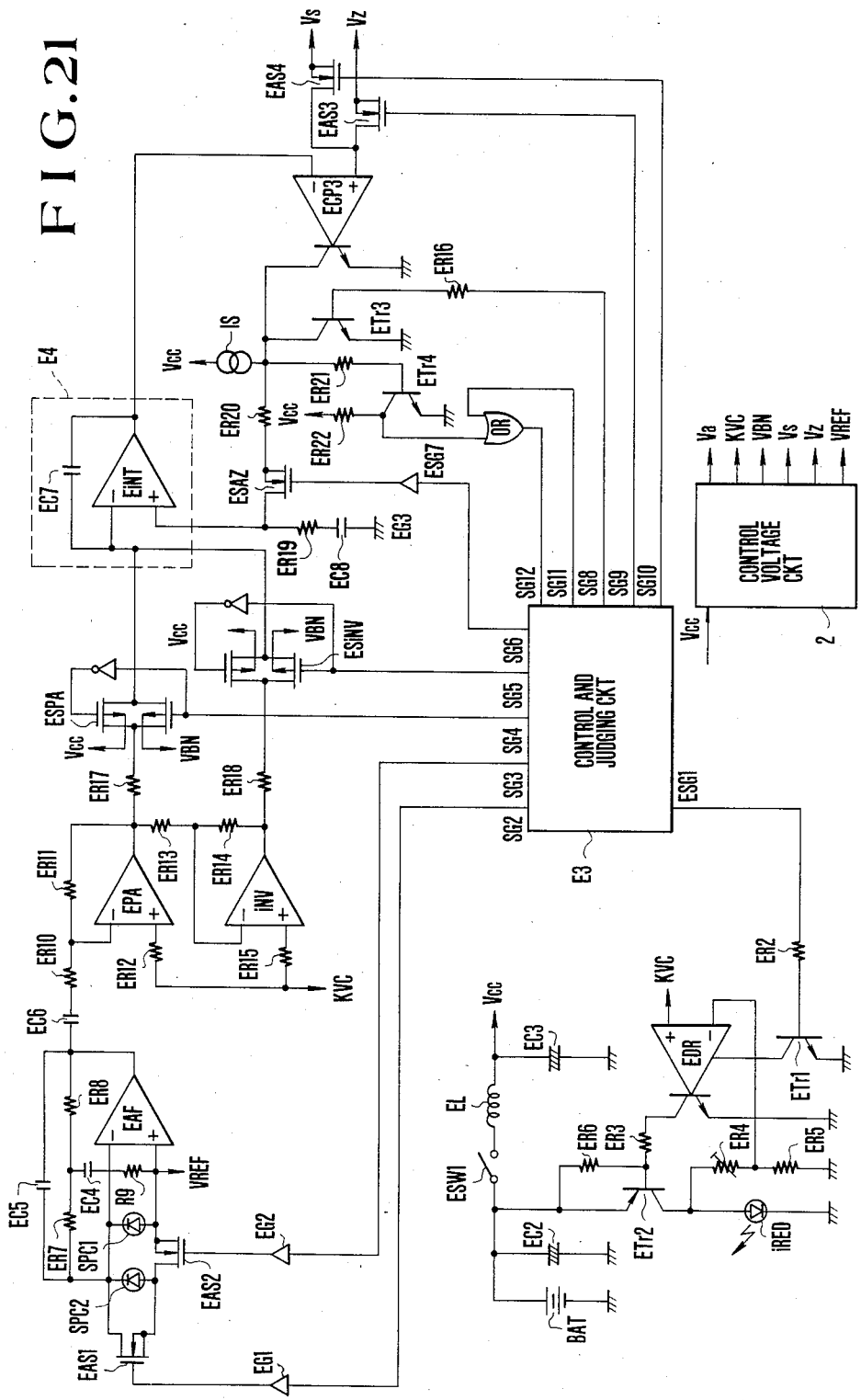
FIG. 21 is a circuit diagram showing an eleventh embodiment of the invention.
Figure 22:
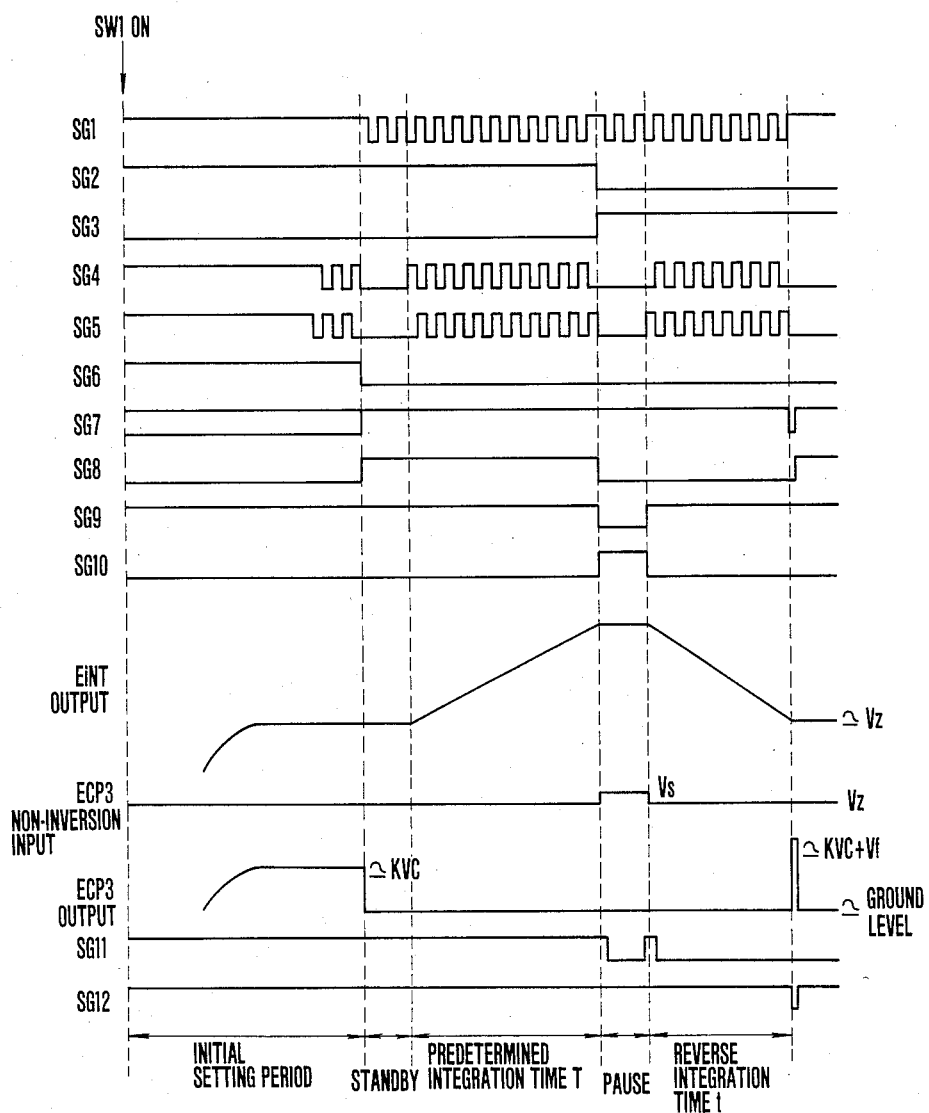
FIG. 22 is a time chart showing the operation of the eleventh embodiment.

FIG. 21 shows an eleventh embodiment of the invention. FIG. 22 shows the operation of the embodiment in a time chart. When a shutter release button (not shown) of a camera is depressed, a power supply switch ESW1 turns on. A π type power supply filter consists of capacitors EC2 and EC3 and a choke coil EL. With the power supply switch ESW1 turned on, the voltage of a battery BAT, which serves as the power source, is produced via the power supply filter as power supply voltage Vcc. The power supply voltage Vcc is supplied to a constant voltage circuit 2. The circuit 2 supplies reference voltages Va and KVC, a bias voltage $V_{BN}$, a low reference level voltage Vs, an initial value voltage Vz and a reference voltage $V_{REF}$ to applicable parts. An initial setting operation is first performed. A control and judging circuit E3 keeps a control signal ESG1 at a high level. This turns on a strobing transistor ETr1 via a resistor ER2. The output of an operational amplifier EDR is fixed at a low level. Therefore, a driving circuit, which consists of a transistor ETr2, resistors ER3, ER4, ER5 and ER6 and the operational amplifier EDR, does not operate. The infrared ray emitting diode iRED does not emit the light. The control and judging circuit E3 is substantially the same as the control circuit 4 of FIG. 17. This judging circuit E3 produces a control signal SG2 at a high level and another control signal SG3 at a low level turning on, via buffer gates EG1 and EG2, an analog switch EAS1 and turning off another analog switch EAS2. This causes the photo-sensitive element SPC1 alone to be connected to the input terminal of an operational amplifier EAF. The photo-sensitive elements SPC1 and SPC2, which are arranged in the same manner as the photo-sensitive elements of FIG. 4, are disposed away from the light projecting axis of the infrared ray emitting diode iRED in the base length direction. Assuming that the output signals produced from these photo-sensitive elements SPC1 and SPC2 when reflection light received from an object to be photographed are A and B, a value A/(A+B) or B/(A+B) is approximately proportional to the drawn out extent of a lens. During the initial setting period, however, no light is emitted from the infrared ray emitting diode iRED and, therefore, the photo-sensitive element SPC1 produces no output. The output voltage of a current-to-voltage converting circuit, which consists of resistors ER7, ER8 and ER9, capacitors EC4 and EC5 and an operational amplifier EAF, produces no output voltage. As a result, a pre-amplifier, which consists of a capacitor EC6, resistors ER10 and ER11 and an operational amplifier EPA and has an amplification factor of −ER11/ER10 times, produces an output of $KVC+V_{OFPA}$, wherein KVC represents a reference voltage impressed on the non-inversion input terminal of the operational amplifier EPA and $V_{OFPA}$ the input offset voltage of the operational amplifier EPA. Meanwhile, an inverting amplifier, which consists of resistors ER13 and ER14 having the same resistance value and an operational amplifier EiNV and has an amplification factor of −1 time, produces an output of $KVC+2V_{OFiNV}-V_{OFPA}$, wherein $V_{OFiNV}$ represents the input offset voltage of the operational amplifier EiNV. The operational amplifier EiNV also impresses the reference voltage KVC on its non-inversion input terminal via a resistor ER15.

During the first half of the initial setting period, the control and judging circuit E3 keeps control signals SG4 and SG5 at high levels. Therefore, analog switches ESPA and ESiNV respectively turn on. Furthermore, the circuit E3 makes the level of a control signal SG6 high, causing an analog switch ESAZ to turn on via a buffer gate EG3; and makes the level of another control signal SG8 low causing a transistor ETr3 to turn off via a resistor ER16. Furthermore, the control and judging circuit E3 makes the level of a control signal SG9 high thereby turning on an analog switch EAS3 which is composed of an MOS-FET and turning off another analog switch EAS4 which is composed of an MOS-FET in a way which gives an initial value Vz to the non-inversion input terminal of a comparator ECP3. With the analog switches ESPA and ESiNV turned on, the output voltage $KVC+V_{OFPA}$ of the operational amplifier EPA is converted into a current by a resistor ER17. At the same time, a resistor ER18, which is of the same resistance value as that of the resistor ER17, converts the output voltage $KVC+2V_{OFiNV}-V_{OFPA}$ of the operational amplifier EiNV into a current. The sum of these two currents is supplied to an integrator E4 which consists of a capacitor EC7 and an operational amplifier EiNT having an MOS-FET input. If the potential of the inversion input terminal of the operational amplifier EiNT is lower than the output voltages of the operational amplifiers EPA and EiNV, the capacitor EC7 is charged. If the potential is higher than the output voltages of these operational amplifiers EPA and EiNV, the capacitor EC7 is discharged via resistors ER17 and ER18. In this manner, the potential of the inversion input terminal of the operational amplifier EiNT approaches the reference voltage KVC. Concurrently, the potential of the non-inversion input terminal of the operational amplifier EiNT and the potential of a connection point between a resistor ER19 and an offset compensating capacitor EC8, i.e. the charging voltage of the offset compensating capacitor EC8, also approaches the reference voltage KVC until a stable condition is obtained.

With the analog switch ESAZ turned on, the output terminal of the comparator ECP3 is connected via a resistor ER20 to the non-inversion input terminal of the operational amplifier EiNT and a series circuit consisting of the resistor ER19 and the offset compensating capacitor EC8. Then, if the output voltage of the integrator E4, immediately after the power supply is switched on, is lower than the threshold value $V2+V_{OFCP}$ (wherein $V_{OFCP}$ represents the input offset voltage of the comparator ECP3) of the comparator ECP3, the voltage of the output terminal of the comparator ECP3 becomes high level. The offset compensating capacitor EC8 is charged via resistors ER20 and ER19 with a current flowing from a constant current source IS. This raises the potentials of the non-inversion and inversion input terminals of the operational amplifier EiNT. The output terminal potential of the operational amplifier EiNT approximately coincides with the non-inversion input voltage V2 of the comparator ECP3 and becomes stable.

Figure 23:
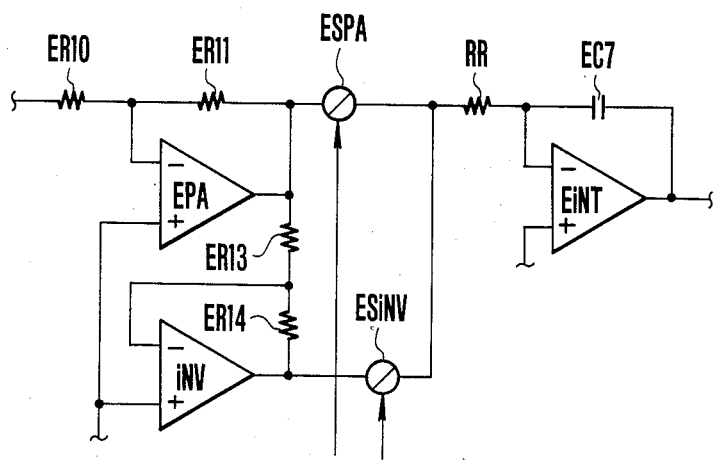
FIG. 23 is a circuit diagram showing a circuit being compared with the circuit of FIG. 21.

In this embodiment, one terminal of each of the analog switches ESPA and ESiNV is connected directly to the inversion input terminal of the operational amplifier EiNT while the other terminal is connected to the output terminal of the operational amplifier EPA or EiNV via the resistor ER17 or ER18, which has the same resistance value as the other. During the first half of the initial setting period, these analog switches ESPA and ESiNV remain on. Referring to FIG. 23, this arrangement makes the length of time required for initial setting shorter than the circuit arrangement in which one terminal of each of the analog switches ESPA and ESiNV is connected to the inversion terminal of the operational amplifier EiNT via a resistor RR having the same resistance value as that of the resistor ER17 or ER18 (see FIG. 21) and having these analog switches ESPA and ESiNV alternately turned on and off from the beginning of the initial setting period. In other words, in this embodiment, during the time period during which the analog switches ESPA and ESiNV are simultaneously on, the parallel composite resistance of the resistors ER17 and ER18 works in the same manner as the resistor RR shown in FIG. 23. Therefore, these resistors ER17, ER18 equivalently serve as if the resistance value of the resistor RR had been reduced by half. In the case of FIG. 21, therefore, the transfer function for transfer from the operational amplifiers EPA and iNV to the resistor ER19 and the offset compensating capacitor EC8 can be expressed as follows:

Supposing that $$Rp = \frac{ER17 \cdot ER18}{ER17 + ER18},$$

it becomes $$\frac{1}{j\omega EC7 Rp + 1} \cdot \frac{1}{j\omega EC8 ER19 - 1}$$

In the event of EC8 ER19 < EC7 ERp, the initial speed setting is determined by a time constant EC7 Rp. Therefore, compared with the circuit arrangement shown in FIG. 23, there is obtained a relation of RR=2Rp and the speed is thus doubled, so that the length of time required for initial setting can be shortened.

With the analog switches ESPA and ESiNV connected directly to the inversion input terminal of the operational amplifier EiNT, a predetermined bias voltage $V_{BN}$ is impressed on the back gate of an N channel MOS-FET included in the FET's forming these analog switches ESPA and ESiNV. Therefore, the analog switches ESPA and ESiNV can be formed by the MOS-FET's. An analog switch composed of an MOS-FET retains some resistance value even while it is on. The resistance value fluctuates with a voltage between the gate and source. In an application such as in this embodiment, a series circuit of a resistor and an analog switch must be equivalently arranged as one resistor. For this purpose, however, the resistance value of the analog switch ESPA, ESiNV must either be sufficiently smaller than the series resistance or must be of a non-linear small value. Such being the requirement, among the FET's forming the analog switches ESPA and ESiNV, the back gate of an N channel FET receives the predetermined bias voltage $V_{BN}$, which is higher by a suitable degree than the lowest of the circuit voltages, so that the resistance values of the analog switches ESPA and ESiNV can be small. The purpose of this arrangement is to moderate the back gate effect whereby the threshold voltage $V_T$ of the MOS-FET equivalently increases due to a voltage between the source and the back gate. This effect is generally moderated by shifting the voltage to be impressed on the back gate. However, such an arrangement results in an increase in noise. Furthermore, since one terminal of each of the analog switches ESPA and ESiNV is connected to the inversion input terminal of the operational amplifier EiNT, the voltage of the terminal becomes constant. Meanwhile, the voltage of the other terminal becomes a value divided by the resistors ER17 and ER18 and the resistance values of the analog switches ESPA and ESiNV, so that the voltage variation can be limited to a small extent even in the event of large fluctuations in the output voltages of the operational amplifiers EPA and iNV. Since nonlinearity of the on resistance of the MOS-FET results from voltage fluctuations between the gate and the source of the MOS-FET, the above arrangement, which lessened the voltage variation reduces the nonlinearity problem.

During the latter half of the initial setting period, the control and judging circuit E3 makes the control signals SG4 and SG5 into high frequency pulse signals having a phase difference of 180°. These control signals SG4 and SG5 cause the analog switches ESPA and ESiNV to alternately turn on and off. This settles the voltage of the offset compensating capacitor EC8 at a value that accurately stabilizes the output of the integrator E4. This voltage is stored and held after the analog switch ESAZ turns off. Then, the control and judging circuit E3 makes the control signal SG1 into a high frequency pulse signal, which then intermittently turns off a strobing transistor ETr1. During the period when the transistor ETr1 is off, the reference voltage KVC fluctuates to a very small extent, regardless of temperature variation, and the voltage of the battery BAT is boosted by (ER4+ER5)/ER5 times up to a predetermined voltage by the transistor ETr2, rresistors ER3–ER6 and the operational amplifier EDR. This boosted voltage lights up the infrared ray emitting diode iRED. With the strobing transistor ETr1 intermittently turning off, the infrared ray emitting diode iRED flickers at a high frequency. After the lapse of a stand-by time period, which allows the light emission quantity to become stable, an integrating operation begins. During a predetermined integration time T, the analog switches ESPA and ESiNV turn on and off in a suitable phased relation to the flickering operation of the infrared ray emitting diode iRED.

The photo-sensitive element SPC1 receives the near infrared light of the infrared ray emitting diode iRED after it is reflected from the object ob1, ob2 and converts it into a current. This current is converted into a voltage by the operational amplifier EAF, etc. The pre-amplifier, which consists of the operational amplifier EPA, etc., amplifies this voltage into an AC voltage signal centering on the reference voltage KVC. Then, an inverting amplifier consisting of the operational amplifier iNV, etc. inverts the AC voltage signal with the reference voltage KVC in the center. The on-off operation of the analog switches ESPA and ESiNV rectifies the AC voltage signal in the negative direction. The rectified AC voltage signal is integrated by the integrator E4. After a predetermined integration time T has elapsed, the integrating operation pauses with the analog switches ESPA and ESiNV turned off.

During this pause period, the output of the integrator E4 is compared with the low level reference voltage to determine whether the object ob1, ob2 distance is at infinity. For this purpose, the control and judging circuit E3 first makes the level of the control signal SG9 low turning off the analog switch EAS3 and the level of the control signal SG10 high turning on the analog switch EAS4. This shifts the non-inversion input voltage applied to the non-inversion input terminal of the comparator ECP3 from the initial value Vz to the low reference level Vs. During the pause period, the comparator ECP3 compares the output of the integrator E4 with the low reference level Vs. If the output is higher than the level Vs, the level of the output voltage of the comparator ECP3 becomes slow. This comparator ECP3 operates in a collector output manner, in which the current from the constant current source IS is absorbed by the collector of an output transistor disposed within the comparator ECP3. Furthermore, since the transistor ETr3 is turned off by the low level of the control signal SG8 at that time, the current of the constant current source IS does not flow to the resistor ER21. Therefore, the transistor ETr4 is off. The collector of the transistor ETr4, which is connected to a pull-up resistor ER22, produces a comparison result signal SG7 at a high level and supplies it to an OR gate OR. This causes the OR gate OR to produce a judging input signal SG12 at a high level. The high level of this judging input signal SG12 causes the control and judging circuit E3 to judge that a distance measuring operation has not been completed. If a low level output of the integrator E4 does not exceed the reference level Vs, the voltage output of the output terminal of the comparator ECP3 becomes high. The current of the constant current source IS flows to the resistor ER21, turning on the transistor ETr4. This lowers the comparison result signal SG7 level. Since an inhibition signal SG11 is at a low level at that instant, the judging input signal SG12 level also becomes low. When the level of the input signal SG12 becomes low during the pause period, the control and judging circuit E3 judges that the object ob1, ob2 is located at an infinite distance.

During a period from the beginning of the initial setting period to the end of a predetermined integration time T and also during the transient period within which the non-inversion input voltage of the comparator ECP3 shifts from the initial value Vz to the low reference level Vs and vice versa, the control and judging circuit E3 supplies a high level inhibition signal SG11 to the OR gate OR to forcedly cause the level of the judging input signal SG12 produced from the OR gate OR to become high. The purpose is to prevent an erroneous operation due to noise and also to inhibit the control and judging circuit E3 from receiving any comparison result signal SG7 even if the signal SG7 is produced by some erroneous operation during the transient period during which the output of the comparator ECP3 has not yet been stabilized.

After the pause period, the relation between the flickering phase of the infrared ray emitting diode iRED and the phase of the on-off operation of the analog switches ESPA and ESiNV is reversed and reverse integration is performed. In this situation, both the photo-sensitive elements SPC1 and SPC2 are connected to the operational amplifier EAF. When the comparator ECP3 detects that the output of the integrator E4 has returned to the initial value Vz, the comparison result signal SG7 level becomes low. Then, the OR gate OR allows the low level judging input signal SG12 (a distance measurement completion signal) to reach the control and judging circuit E3. The circuit E3 then judges the object ob1, ob2 distance from the reverse integration time t counted by a counter (not shown) and stops the infrared ray emitting diode iRED from flickering. The analog switches ESPA, ESiNV and ESAZ are turned off.

The analog switch ESAZ, which is composed of a MOS-FET, is provided with a parasitic diode $D_{SD}$ disposed between the drain and the source IS and parasitic capacitors $C_{GS}$ and $C_{GD}$ disposed between the gate and the source IS and between the gate and the drain. When the analog switch ESAZ is provided with parasitic diode $D_{SD}$, even if a voltage which would turn off the analog switch ESAZ is applied to the gate and even if the output of the comparator ECP tries to reach a high level, this output causes a current to flow to the resistor ER19 and the offset compensating capacitor EC8 via the resistor ER20 and the parasitic diode $D_{SD}$. Then, this current changes the voltage stored at the offset compensating capacitor EC8. In measuring ordinary distance to the object ob1, ob2, the inversion input voltage of the comparator ECP3 becomes a higher voltage than the initial value V2 and the reference level Vs. Then the output level of the comparator ECP3 becomes low as represented by the output wave form of the operational amplifier EiNT of FIG. 22. Therefore, no problem arises. However, in a situation where the object ob1, ob2 distance is very far and the output of the operational amplifier EiNT remains at are almost fixed level, if a noise causes the output of the comparator ECP3 to fluctuate and become a high level and if the voltage stored at the offset compensating capacitor EC8 is changed as mentioned above, no distance measuring operation can be performed thereafter. To prevent this from happening, the control and judging circuit E3 turns on the transistor Tr3 and forcedly lowers the output of the comparator ECP3 nearly to the ground level immediately afer a certain voltage level is stored at the offset compensating capacitor EC8, with the analog switch ESAZ turned off, until the low reference level Vs is given to the non-inversion input terminal of the comparator ECP3 for minute level detection and also after distance measurement completion.

Furthermore, when the gate voltage of the analog switch ESAZ is changed, shifting it from on to off, the electric charge stored at the parasitic capacitor $C_{GD}$ changes the voltage of the offset compensating capacitor EC8. To minimize and to make the extent of this change constant, the buffer gate EG3 gives the ground level to the gate of the analog switch ESAZ when the control signal SG6 is at a low level and gives the reference voltage Va to the gate when the control signal is at a high level. The reference voltage Va has the smallest possible but sufficient amplitude for turning on and off the MOS-FET, which forms the analog switch ESAZ. Furthermore, the buffer gates EG1 and EG2 also make the level of the reference voltage Va high.

When the output of the comparator ECP3 reaches a correct high level, i.e. when a voltage lower than the non-inversion input voltage is applied to the comparator ECP3 with the control signal SG8 being at a low level, the output voltage thereof does not rise higher than a level which is approximately KVC+Vf, wherein Vf represents the forward voltage drop of the parasitic diode $D_{SD}$, which is about 0.7 V. This is because the current of the constant current source IS flows to the offset compensating capacitor EC8 via the resistor ER20, the parasitic diode $D_{SD}$ of the analog switch ESAZ and the resistor ER19. A transistor ETr4 is provided for the purpose of converting the limited amplitude of the output of the comparator ECP3 to an amplitude sufficient to be received by the control and judging circuit E3. The transistor ETr4 can be considered a gate which operates on and off, having the forward voltage drop Vf of the parasitic diode $D_{SD}$ as a threshold voltage. Therefore, the transistor ETr4 is turned on and off without fail by the high level output voltage of the comparator ECP3. The amplitude of the output voltage of the transistor thus becomes a value Vcc and is thus receivable by the control and judging circuit E3.

Furthermore, the non-inversion input terminal of the comparator ECP3 has the initial value Vz or the low reference level Vs selectively given thereto. However, the input level may also be shiftable to a higher reference level for an object Ob1, Ob2 which is located closer and has a high reflection factor.

As mentioned in the foregoing, the embodiment comprises comparison means which is composed of a single comparator; switch means which selectively gives to the reference voltage input terminal of the comparator the initial value of an integrator and a reference level which slightly differs from the initial value; and inhibiting means for inhibiting the reception of the result of comparison performed by the comparator. The embodiment, thus, accomplishes comparison by means of a single comparator; and to inhibits the reception of the comparison result before the end of the transient period of the reference input shift during which the output of the comparator remains unstable. The embodiment, therefore, permits reduction in the circuit arrangement scale and yet is capable of accurately comparing the output of the integrator with a plurality of reference levels differing only slightly.

In accordance with this invention, the comparison computation on at least two different signals, which varies with the incident angle of reflection light coming from the object being photographed can be accomplished in a short period of time with a compact and simple circuit arrangement without recourse to the large and complex circuit arrangement which was previously required. When the invention is applied to a compact apparatus such as a camera using a battery as the power source, a sufficient dynamic range can be obtained with the voltage of the power source battery, so that very accurate focusing can be accomplished.

What we claim:

1. A distance measuring apparatus comprising:

light projecting means;

light receiving means for producing in sequence at least two different signals corresponding to the incident angle of a reflection light from a distance measuring object;

integrating means for integrating the first output of said light receiving means for predetermined period of time and performing reverse integration according to the second output of the light receiving means;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of time counting means.

2. A distance measuring apparatus according to claim 1, wherein said integrating means includes an operational amplifier having an input terminal arranged to receive the signals from said light receiving means and a capacitor connected across a feedback path of said operational amplifier.

3. A distance measuring apparatus according to claim 1, wherein said integrating means includes a Miller integrator.

4. A distance measuring apparatus according to claim 1, further comprising means for latching an output signal from said detecting means when the output level of said integrating means has reached the predetermined value.

5. A distance measuring apparatus comprising:

light projecting means;

light receiving means for producing in sequence at least two different signals corresponding to the incident angle of a reflection light from a distance measuring object;

integrating means for integrating the first output of said light receiving means for a predetermined period of time and performing reverse integration according to the second output of the light receiving means;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of time counting means, and comprising means for latching an output signal from said detecting means when the output level of said integrating means has reached the predetermined value and further comprising means connected to said latching means for rendering said detecting means inoperative in response to a latching operation of said latching means.

6. A distance measuring apparatus comprising:

light projecting means;

light receiving means for producing in sequence at least two different signals corresponding to the incident angle of a reflection light from a distance measuring object;

integrating means for integrating the first output of said light receiving means for a predetermined period of time and performing reverse integration according to the second output of the light receiving means;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of time counting means, and further comprising means for interrupting an integrating operation of said integrating means during a predetermined time interval after completion of an integrating operation on said first output signal from said light receiving means.

7. A distance measuring apparatus according to claim 1, wherein said time counting means includes a counter.

8. A distance measuring apparatus according to claim 7, wherein said distance information producing means includes a decoder responsive to the content of said counter for producing distance information according to the content of the counter.

9. A distance measuring apparatus comprising:

light projecting means;

light receiving means for producing in sequence at least two different signals corresponding to the incident angle of a reflection light from a distance measuring object;

integrating means for integrating the first output of said light receiving means for a predetermined period of time and performing reverse integration according to the second output of the light receiving means;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of time counting means, and wherein said light receiving means includes first and second light sensitive elements and an output circuit, said output circuit being arranged to have a first electrical signal from the first light sensitive element and the sum of the first electrical signal and a second electrical signal from the second light sensitive element supplied in sequence to the integrating means.

10. A distance measuring apparatus comprising:

light projecting means;

light receiving means for producing in sequence at least two different signals corresponding to the incident angle of a reflection light from a distance measuring object;

integrating means for integrating the first output of said light receiving means for a predetermined period of time and performing reverse integration according to the second output of the light receiving means;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of time counting means, and further comprising second detecting means connected to said integrating means for detecting the integration level of said integrating means corresponding to the first output of said light receiving means after the lapse of the predetermined period of time from commencement of the integrating operation of said integrating means to produce distance information corresponding to a specific distance when said integration level is not exceeding a predetermined value.

11. A distance measuring apparatus according to claim 1, wherein said light receiving means includes a semiconductor position sensing device.

12. A distance measuring apparatus according to claim 1, wherein said light projecting means includes an infrared illuminating element.

13. A distance measuring apparatus comprising:

light projecting means;

light receiving means for producing in sequence at least two different signals corresponding to the incident angle of a reflection light from a distance measuring object;

integrating means for integrating the first output of said light receiving means for a predetermined period of time and performing reverse integration according to the second output of the light receiving means;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of time counting means, wherein said light projecting means includes an infrared illuminating element and further comprising means for rendering said integrating means operative for an integrating operation after said infrared illuminating element has reached a state of thermal equilibrium.

14. In a distance measuring apparatus having light projecting means for projecting a light on a distance measuring object over a predetermined period of time and light receiving means for receiving a reflection light from said object at a point varying according to a distance to the object, said apparatus being arranged to perform a distance detecting operation for detecting said distance on the basis of the point of the incident light on the light receiving means, the improvement comprising means for rendering said distance detecting operation operative after said light projecting means has reached a state of thermal equilibrium.

15. A distance measuring apparatus comprising:

light receiving means for receiving light from an object whose distance is to be measured and for producing at least two different first and second unknown signals corresponding to the light intensity representative of the distance to the object;

one signal line means having a single line input functionally connected to said light receiving means;

control means which are connected to said light receiving means for delivering, in time series, the first and second unknown signals to said one signal line means, said control means rendering the unknown signals of said light receiving means selectively effective;

integrating means for performing a forward integration on the basis of the first unknown signal of said light receiving means for a predetermined period of time, and performing reverse integration according to the second unknown signal of the light receiving means after completion of the forward integration;

detecting means for detecting that the output of said integrating means has reached a predetermined value during said reverse integration;

time counting means for detecting the time of said reverse integration in response to the output of said detecting means; and distance information producing means for producing information on a distance to said object on the basis of the output of said time counting means.

16. A distance measuring device according to claim 15, further comprising light projecting means for projecting light on the object.

17. A distance measuring device according to claim 16, wherein said light receiving means includes a plurality of independent light receiving elements located at separated positions for receiving light projected by said light projecting means and reflected by the object and for producing the output signal corresponding to the respective positions of said plurality of light receiving elements.

18. A distance measuring device according to claim 17, wherein said one signal line means includes an amplifier connected between said light receiving elements and said distance indicating means.

19. A distance measuring device according to claim 18, wherein said control means includes a plurality of switches connected to said light receiving elements and each one of said switches is selectively actuated for delivering in time series the output signals to one signal line means.

20. A distance measuring device according to claim 19, wherein said switches include a plurality of FETs.

21. A distance measuring apparatus comprising:
light projecting means;
light receiving means for producing in sequence at least two different unknown signals corresponding to the incident angle of a reflection light from a distance measuring object;
integrating means for performing a forward integration on the basis of the first unknown signal of said light receiving means for a predetermined period of time and performing reverse integration according to the second unknown signal of the light receiving means after completion of the forward integration;
detecting means for detecting that the output of said integrating means has reached a predetermined value during said reverse integration;
time counting means for detecting the time of said reverse integration in response to the output of said detecting means; and
distance information producing means for producing information on a distance to said object on the basis of the output of time counting means.

22. A distance measuring apparatus comprising:
light projecting means for projecting light onto an object whose distance is to be measured;
light receiving means having a plurality of independent light receiving elements located at separated positions for receiving light projected by said light projecting means and reflected by the object and for producing in sequence at least two different unknown signals corresponding to the respective positions of said plurality of light receiving elements;
integrating means for performing a forward integration on the basis of a first of said unknown signals of said light receiving means for a predetermined period of time and performing reverse integration on the basis of a second of said unknown signals of the light receiving means after completion of the forward integration;
ratio detecting means functionally connected to integrating means for detecting a ratio between a performance time of said forward integration and a performance time of the reverse integration; and
distance indicating means for indicating distance data to the object on the basis of said ratio from the ratio detecting means.

23. A distance measuring apparatus comprising:
light projecting means;
light receiving means for producing in sequence at least two different unknown signals corresponding to the incident angle of a reflection light from a distance measuring object;
integrating means for performing a forward integration on the basis of the first unknown signal of said light receiving means for a predetermined period of time and performing reverse integration according to the second unknown signal of the light receiving means after completion of the forward integration;
detecting means for detecting that the output of said integrating means has reached a predetermined value during said reverse integration;
time counting means for detecting the time of said reverse integration in response to the output of said detecting means;
distance information producing means for producing information on a distance to said object on the basis of the output of time counting means;
control signal producing means for detecting an output level of the integrating means during a period of said forward integration so that it produces a control signal when the output level reaches a first level; and
first compressing means connected to said integrating means and said control signal producing means for compressing the output level of said integrating means after the control signal is produced.

24. A distance measuring apparatus according to claim 23, further comprising second compressing means functionally for detecting an output level of the integrating means during a period of said reverse integration and compressing the output level of said integrating means until the output level reaches said first level.

25. A distance measuring apparatus comprising:
light projecting means;
light receiving means for producing in sequence at least two different unknown signals corresponding to the incident angle of a reflection light from a distance measuring object;

integrating means for performing a forward integration on the basis of the first unknown signal of said light receiving means for a predetermined period of time and performing reverse integration according to the second unknown signal of the light receiving means after completion of the forward integration;

detecting means for detecting that the output of said integrating means has reached a predetermined value during said reverse integration;

time counting means for detecting the time of said reverse integration in response to the output of said detecting means;

distance information producing means for producing information on a distance to said object on the basis of the output of time counting means;

pulse generating means for applying such pulses as having a predetermined frequency to said light projecting means for intermittently energizing said light projecting means;

switching means connected between said light receiving means and said integrating means for applying the unknown signals from said light receiving means in response to the pulses from said pulse generating means; and phase shifting means for shifting by 180° the phases of the pulses supplied to said light projecting means and said switching means.

* * * * *